US008649163B2

(12) United States Patent
Tanaka et al.

(10) Patent No.: US 8,649,163 B2
(45) Date of Patent: Feb. 11, 2014

(54) INFORMATION PROCESSING APPARATUS

(75) Inventors: Soichi Tanaka, Kanagawa (JP);
Masanori Akiyama, Kanagawa (JP);
Mamoru Kato, Nagano (JP); Koichi Hiroyoshi, Nagano (JP)

(73) Assignee: Sony Corporation, Tokyo (JP)

( * ) Notice: Subject to any disclaimer, the term of this patent is extended or adjusted under 35 U.S.C. 154(b) by 229 days.

(21) Appl. No.: 13/188,742

(22) Filed: Jul. 22, 2011

(65) Prior Publication Data

US 2012/0026662 A1 Feb. 2, 2012

(30) Foreign Application Priority Data

Jul. 29, 2010 (JP) ................................ P2010-170114
Dec. 22, 2010 (JP) ................................ P2010-285761

(51) Int. Cl.
*G06F 1/16* (2006.01)

(52) U.S. Cl.
USPC ................................. 361/679.08; 361/679.02

(58) Field of Classification Search
CPC ........................................................ G06F 1/16
USPC ........................................ 361/679.08, 679.02
See application file for complete search history.

(56) References Cited

U.S. PATENT DOCUMENTS

| 7,492,421 | B1 * | 2/2009 | Kim et al. ........................ 349/58 |
| 8,213,166 | B2 * | 7/2012 | Mihara et al. ............... 361/679.1 |
| 2007/0155914 | A1 * | 7/2007 | Chen et al. ..................... 525/461 |
| 2008/0212307 | A1 * | 9/2008 | Chan et al. ....................... 362/85 |
| 2009/0042443 | A1 * | 2/2009 | Ma ................................. 439/607 |
| 2009/0067125 | A1 * | 3/2009 | Xia et al. ................. 361/679.27 |
| 2009/0091478 | A1 * | 4/2009 | Chan et al. ...................... 341/22 |
| 2011/0109562 | A1 * | 5/2011 | Lin .............................. 345/173 |
| 2011/0255227 | A1 * | 10/2011 | Murakami ............... 361/679.01 |
| 2012/0026095 | A1 * | 2/2012 | Tanaka .......................... 345/168 |

OTHER PUBLICATIONS

U.S. Appl. No. 13/158,807, filed Jun. 13, 2011, Tanaka.

* cited by examiner

*Primary Examiner* — Timothy Thompson
*Assistant Examiner* — Charles Pizzuto
(74) *Attorney, Agent, or Firm* — Oblon, Spivak, McClelland, Maier & Neustadt, L.L.P.

(57) ABSTRACT

Provided is an information processing apparatus includes an exterior plate and a sheet-like member. The exterior plate is formed of a plate-like member. The exterior plate has one of a transparent first area and a semi-transparent first area. The sheet-like member is arranged on a rear surface of the exterior plate.

12 Claims, 25 Drawing Sheets

INFORMATION PROCESSING APPARATUS

BACKGROUND

The present disclosure relates to an information processing apparatus.

In recent years, the importance of design is growing in information processing apparatuses such as a personal computer, a mobile terminal, and an electronic book apparatus. Further, even in one model thereof, there are many combinations of color, pattern, and the like for a casing, and the variety of designs increasingly becomes important.

For example, in the case where a pattern is provided on a casing, laser processing is performed to respond to a variety of designs.

Further, regarding a casing, a high-quality texture can be given thereto, in addition to the pattern or shape thereof, by painting an inner side of a top plate formed of an acrylic transparent resin to cause a color to stand out and providing a pattern for irregular reflection to a front surface thereof.

In addition, there is also known a structure in which a panel constituting a part of a casing emits light. For example, a light guide body is used as the panel. In the structure, a light source such as an LED (light emitting diode) is provided inside a device and the light from the light source is propagated to the panel of the light guide body. On a rear surface of the panel, patterns such as logos are printed in white color, and light propagated along the panel of the light guide body is partially reflected on the printed portion so as to be output to the front side of the panel. As a result, there is obtained such an illumination effect that the patterns such as logos are profiled on the front surface of the panel, and the improvement in aesthetic appearance of the device can be expected (see, for example, Japanese Patent Application Laid-open No. 2004-326901 (paragraph [0029], FIG. 3; hereinafter, referred to as Patent Document 1)).

SUMMARY

Various conditions to bring out the appearance of an information processing apparatus include color, light, a texture of a front surface, and so on.

Although laser processing is performed on a casing of an information processing apparatus to achieve a variety of designs, manufacturing costs are increased accordingly and designability thereof is limited.

Further, when the structure in which light is effectively used is adopted, the number of manufacturing steps therefor such as painting and surface processing is increased and costs are increased at the same time. For example, in the case where a light guide plate is adopted as seen in Patent Document 1 or the like, it is necessary to provide a light source in an information processing apparatus, which increases the number of components and power consumption and is inadequate particularly for an apparatus that operates using a battery.

In view of the circumstances as described above, it is desirable to provide an information processing apparatus capable of improving designability and a variety of designs without increasing manufacturing costs.

According to an embodiment of the present disclosure, there is provided an information processing apparatus including: an exterior plate formed of a plate-like member having one of a transparent first area and a semi-transparent first area; and a sheet-like member arranged on a rear surface of the exterior plate. For example, the exterior plate constitutes a top plate of a display unit or a palm rest of a main body unit.

In the embodiment of the present disclosure, by adding decorative designs to the sheet-like member, it is possible to easily provide design variations at low costs. For example, patterns or the like are inserted into the sheet-like member to be harmonized with designs suitable for in-mold forming or painting for the front surface, with the result that a stereoscopic effect can be realized. Further, for example, the sheet-like member is formed as a 3D sheet of the like, and accordingly the design of the front surface can be profiled three-dimensionally. Furthermore, by using a photograph or the like as the sheet-like member, it is possible to customize a design in accordance with user's preference. Such a sheet-like member can hide an inner structure that may impair designability as a matter of course.

In the information processing apparatus, the exterior plate may have an opaque second area including a positioning portion for positioning with respect to the sheet-like member.

In the information processing apparatus, the exterior plate may include, as the positioning portion, a protrusion portion for being integrated with the sheet-like member in the second area by thermal fusion, and the sheet-like member may include a first hole through which the protrusion portion passes at a position corresponding to the protrusion portion.

In the embodiment of the present disclosure, by forming the second area to be opaque, it is possible to hide a portion subjected to thermal fusion serving as, for example, the positioning portion, which may impair designability, without increasing costs. Further, by fixing the sheet-like member to the exterior plate by thermal fusion, it is possible to reduce manufacturing costs.

In the information processing apparatus, the first area may be surrounded by the second area, and the information processing apparatus may further include a double-sided tape that is arranged to correspond to the second area between the exterior plate and the sheet-like member and includes a second hole through which the protrusion portion passes at a position corresponding to the protrusion portion.

In the embodiment of the present disclosure, since the transparent or semi-transparent area on the rear surface of the exterior plate is sealed with the double-sided tape, dust or the like does not enter the area. Therefore, the designability is not impaired by dust or the like. Further, the double-sided tape is also arranged in the second area, and accordingly the designability is not impaired by the presence of the double-sided tape. In addition, by using the double-sided tape as a sealing means as described above, it is possible to reduce manufacturing costs.

In the information processing apparatus, the exterior plate may contain a fluorescent dye to collect light, and the information processing apparatus may further include a touchpad arranged on the rear surface of the exterior plate in the first area and a reflective layer arranged between the rear surface of the exterior plate in the first area and the touchpad. The reflective layer may be formed by performing painting or printing on the sheet-like member, for example.

Accordingly, the area of the touchpad is seen to be brighter than other areas without providing a light source, which improves not only designability but also operability.

According to another embodiment of the present disclosure, there is provided an information processing apparatus including a main body unit and a plate. The main body unit has a first surface provided with a keyboard. The plate has a second surface in contact with the first surface, a third surface opposed to the second surface, a fourth surface connecting an end portion of the second surface and an end portion of the third surface, and a hole that passes through the second surface and the third surface and exposes the keyboard, the plate containing a fluorescent dye to collect light.

In the information processing apparatus, since the plate contains the fluorescent dye to collect light, natural light or artificial light is collected on the third surface and induced to the fourth surface while undergoing the total reflection to be output in a condensed state, with the result that the fourth surface is seen as if to emit light. Similarly, the light is induced to an inner surface of the hole, with the result that the inner surface is also seen as if to emit light. Therefore, by using a material obtained by containing the fluorescent dye to collect light in the plate in the information processing apparatus, it is possible to improve designability with use of light without increasing the number of steps in manufacturing or the number of components.

The information processing apparatus may further include a touchpad set to be in contact with the second surface.

Accordingly, by setting the touchpad on the second surface of the plate, the information processing apparatus can induce the light to a peripheral portion thereof to be output and cause a user to recognize a position of the touchpad.

In the information processing apparatus, the plate may include a groove indicating a setting position of the touchpad on the second surface.

Accordingly, in the information processing apparatus, the groove is provided on the second surface so that a setting operation of the touchpad is made easier at a time of manufacturing, and the light is induced to the groove to be output so that the position of the touchpad can be made to stand out more.

In the information processing apparatus, the plate may have a thickness that is gradually reduced as a distance from the fourth surface becomes larger.

Accordingly, in the information processing apparatus, an area of the fourth surface is secured while a setting position of a component located below the plate is secured, with the result that the improvement of designability with use of light can be achieved.

As described above, according to the embodiments of the present disclosure, it is possible to improving the designability of the information processing apparatus and a variety of designs without increasing manufacturing costs.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings. In this embodiment, a laptop personal computer (hereinafter, referred to simply as PC) is exemplified as an information processing apparatus.

[Structure of PC]

Figure 1:
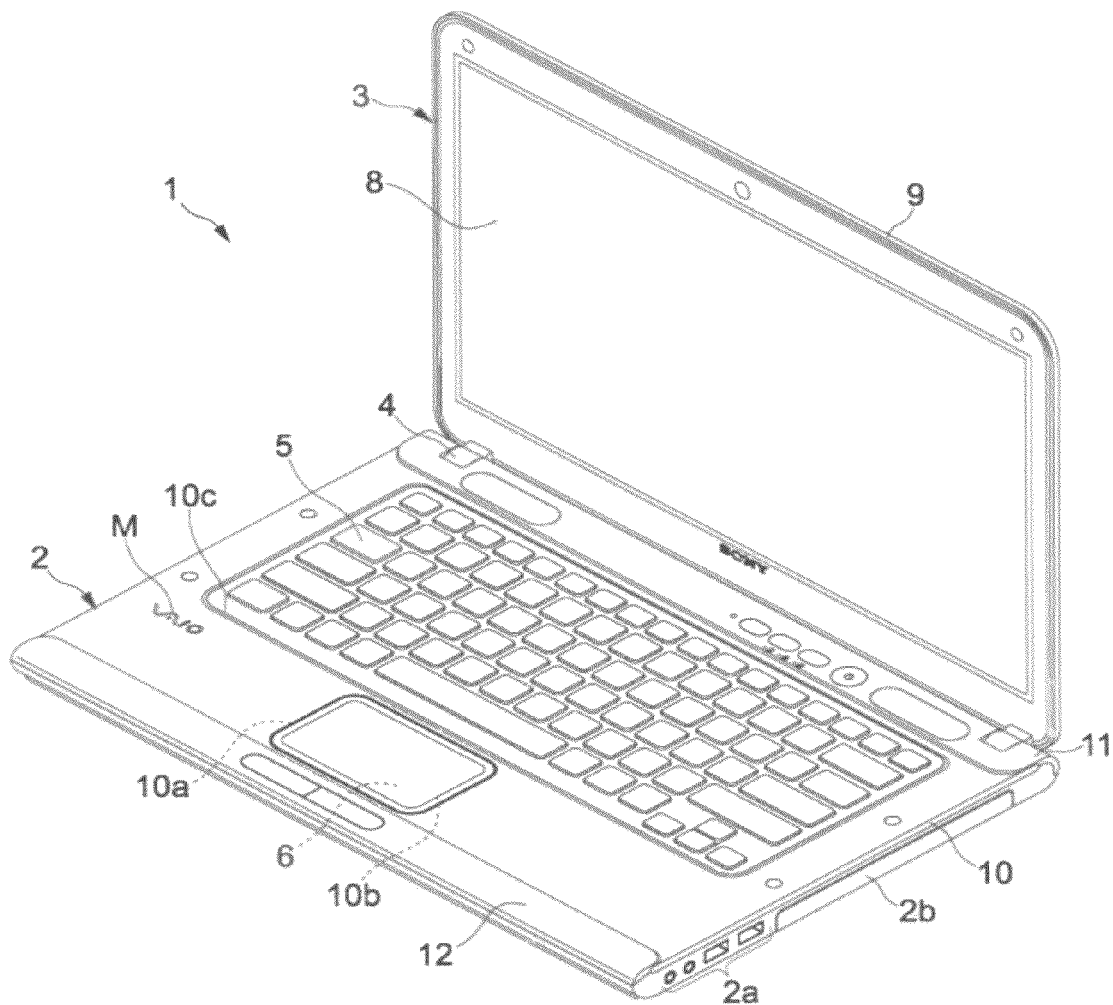
FIG. 1 is a perspective view showing an opened state of a display unit of a PC according to an embodiment of the present disclosure.
Figure 2:
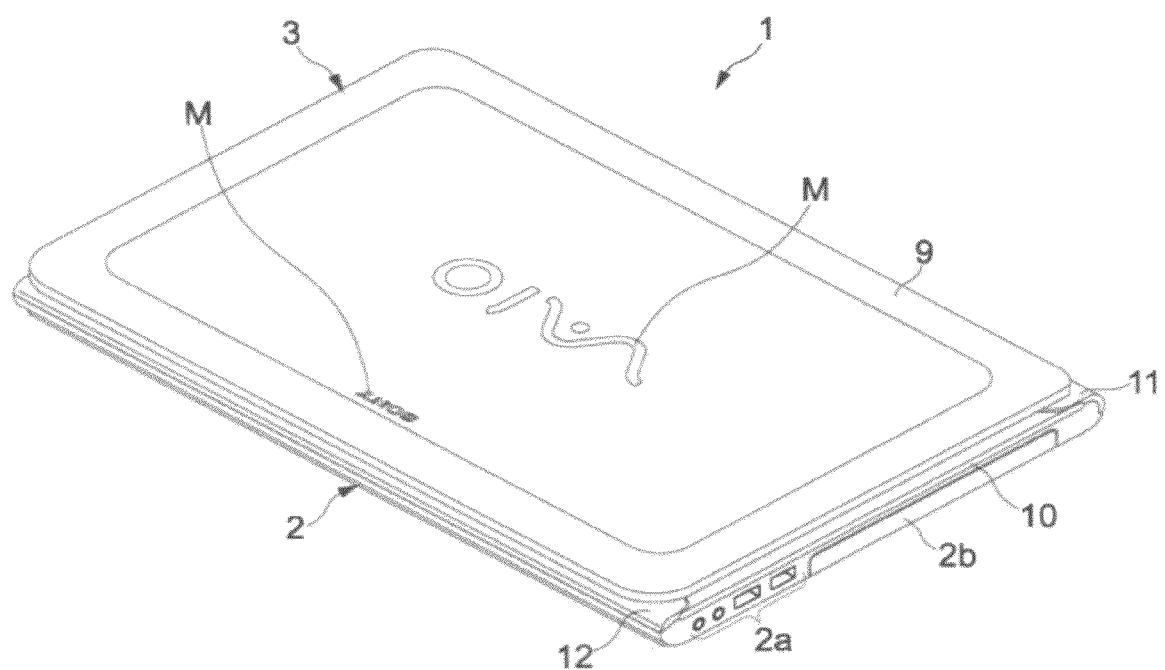
FIG. 2 is a perspective view showing a closed state of the display unit of the PC according to the embodiment of the present disclosure.
Figure 3:
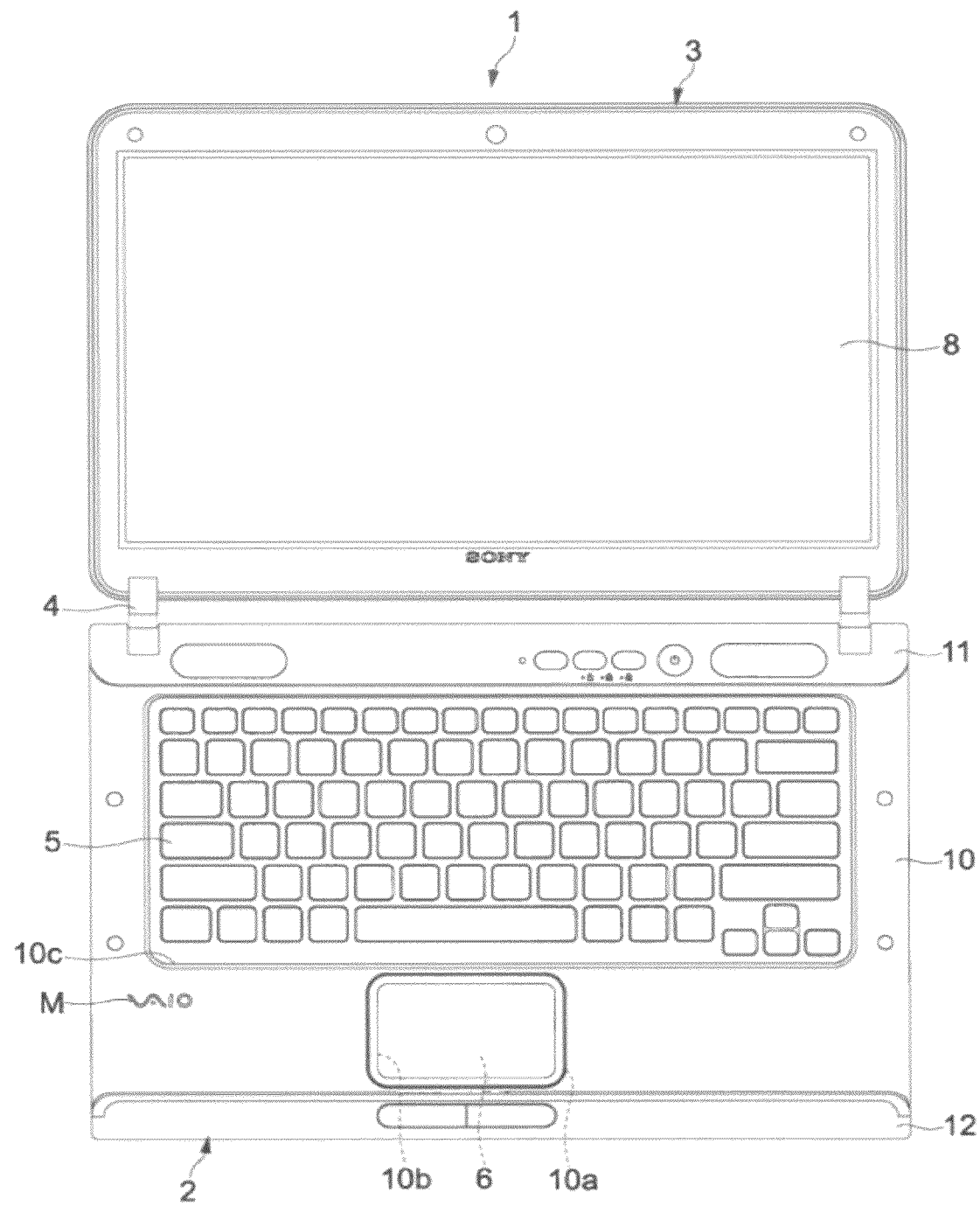
FIG. 3 is a plan view showing the opened state of the display unit of the PC according to the embodiment of the present disclosure.

FIG. 1 is a perspective view showing an opened state of a display unit of a PC according to an embodiment of the present disclosure. FIG. 2 is a perspective view showing a closed state of the display unit of the PC shown in FIG. 1. FIG. 3 is a plan view showing the opened state of the display unit of the PC. FIG. 3 shows the display unit and a main body unit in a state separated from each other. Further, FIGS. 4, 5, 6, 7, 8, and 9 are a back view, a front view, a right side view, a left side view, a plan view, and a bottom view, respectively, showing the closed state of the display unit of the PC.

As shown in those figures, a PC 1 includes a main body unit 2 and a display unit 3. The main body unit 2 and the display unit 3 are coupled to each other so as to be relatively rotatable by hinges 4.

On an upper surface of the main body unit 2, a keyboard 5, a touchpad 6, a power switch, other various types of switches, a status display unit, and the like are arranged. The keyboard 5 is a keyboard having a standard QWRTY key layout. The touchpad 6 is a user interface using a capacitive touch panel, for example. In the vicinity of the touchpad 6, two click buttons to which functions as a left button and a right button of a mouse are assigned are provided.

As shown in FIGS. 1, 2, 6, and 7, on side surfaces of the main body unit 2, various types of external connection terminals 2a, 2d, a disc slot 2b of a disc drive, a slot for a memory card/memory stick, and the like are provided. Examples of the external connection terminals 2a include a USB (Universal Serial Bus), an iLINK, a LAN (Local Area Network), an external display output, a video input, an audio input, an HDMI (High-Definition Multimedia Interface) output, a microphone input, and a headphone output.

Figure 4:
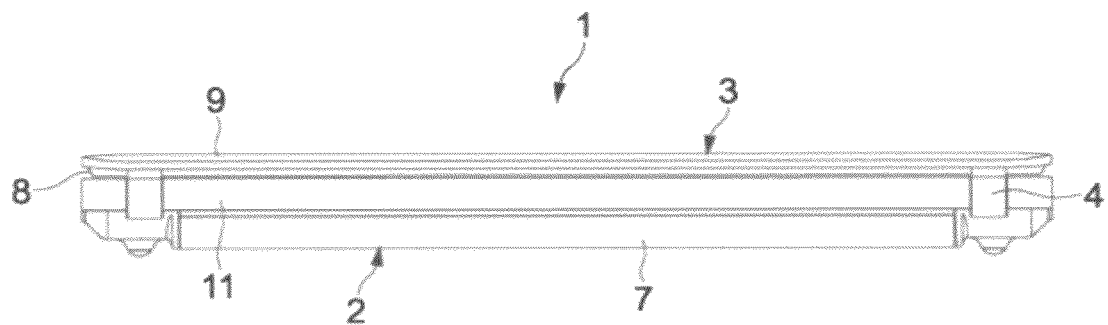
FIG. 4 is a back view showing the closed state of the display unit of the PC according to the embodiment of the present disclosure.
Figure 5:
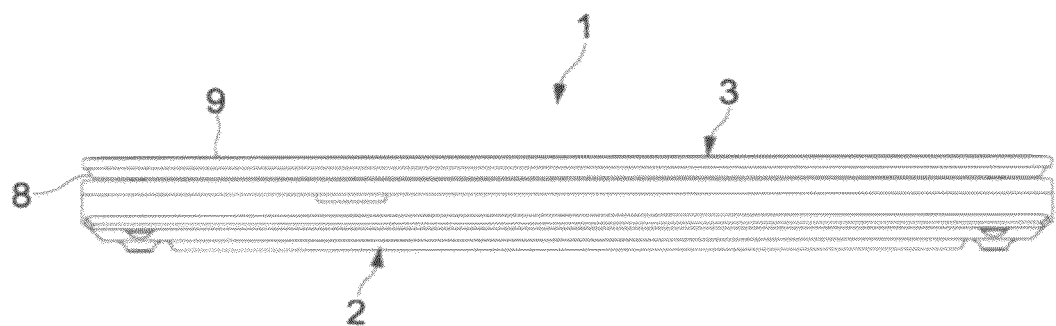
FIG. 5 is a front view showing the closed state of the display unit of the PC according to the embodiment of the present disclosure.
Figure 6:
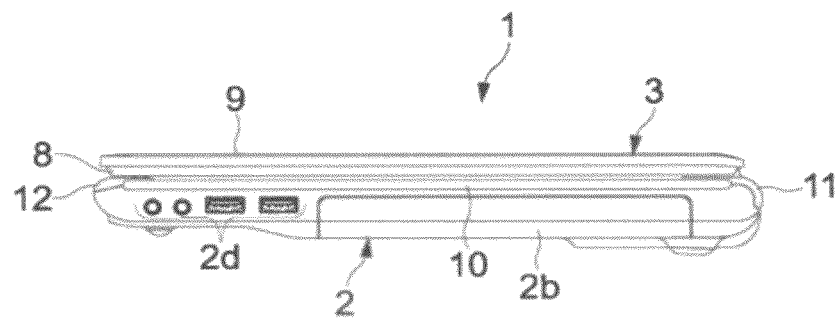
FIG. 6 is a right side view showing the closed state of the display unit of the PC according to the embodiment of the present disclosure.
Figure 7:
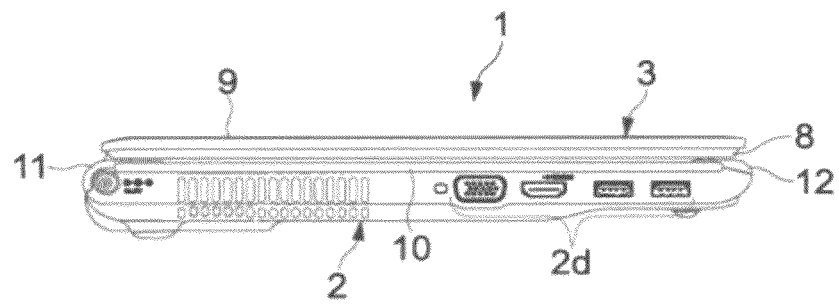
FIG. 7 is a left side view showing the closed state of the display unit of the PC according to the embodiment of the present disclosure.
Figure 9:
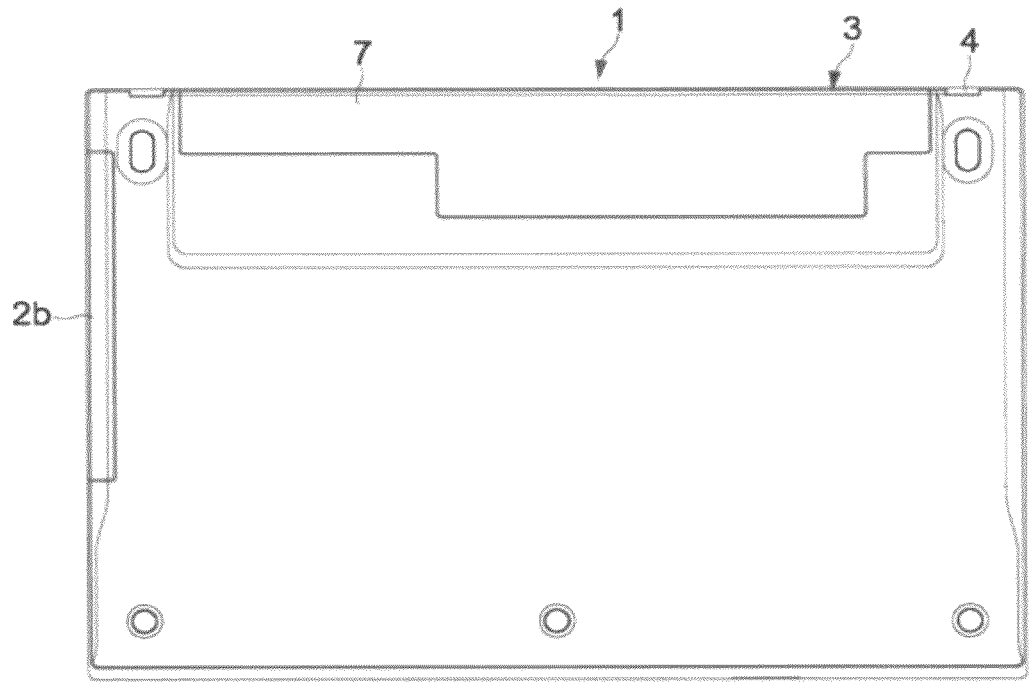
FIG. 9 is a bottom view showing the closed state of the display unit of the PC according to the embodiment of the present disclosure.

As shown in FIGS. 4 and 9, the main body unit 2 includes a battery 7 at an end portion of the bottom surface on the back side. The battery 7 is detachable from the main body unit 2.

Inside the main body unit 2, various types of devices such as a mother board, an optical disc drive, a hard disc drive, a wireless communication device, an audio function, and a speaker/amplifier are provided. On the mother board, a main memory, a CPU, a graphics chip, a chip set, other electronic components such as a control circuit are mounted. The chip set is a chip for managing exchange of data among the devices inside the PC 1. The chip set includes a built-in graphics chip or the like. Further, the chip set includes an interface for connection with peripheral devices such as a nonvolatile memory and an EC (Embedded Controller).

The display unit 3 includes a display panel unit 8 constituted of an LCD (Liquid Crystal Display), for example. The display panel unit 8 includes a display module having a display screen. The display module is incorporated into the display unit 3 such that the display screen thereof is opposed to the upper surface of the main body unit 2 in the closed state of the display unit 3 of the PC 1 and faces to the front in the opened state of the display unit 3 of the PC 1. Further, in the closed state of the display unit 3 of the PC 1, the display unit 3 is used as a lid body of the upper surface of the main body unit 2. Therefore, on a surface of the display unit 3 that is opposite to the display screen (opposed surface), a top plate 9 as a decorative exterior unit is arranged. The top plate 9 is provided with logo marks M of a product name of the PC 1, a manufacturer name, and the like. The structure of the decorative exterior unit of the display unit 3 will be described later. The logo mark M is also provided to the upper surface of the main body unit 2.

[Structure of Display Unit]

Figure 8:
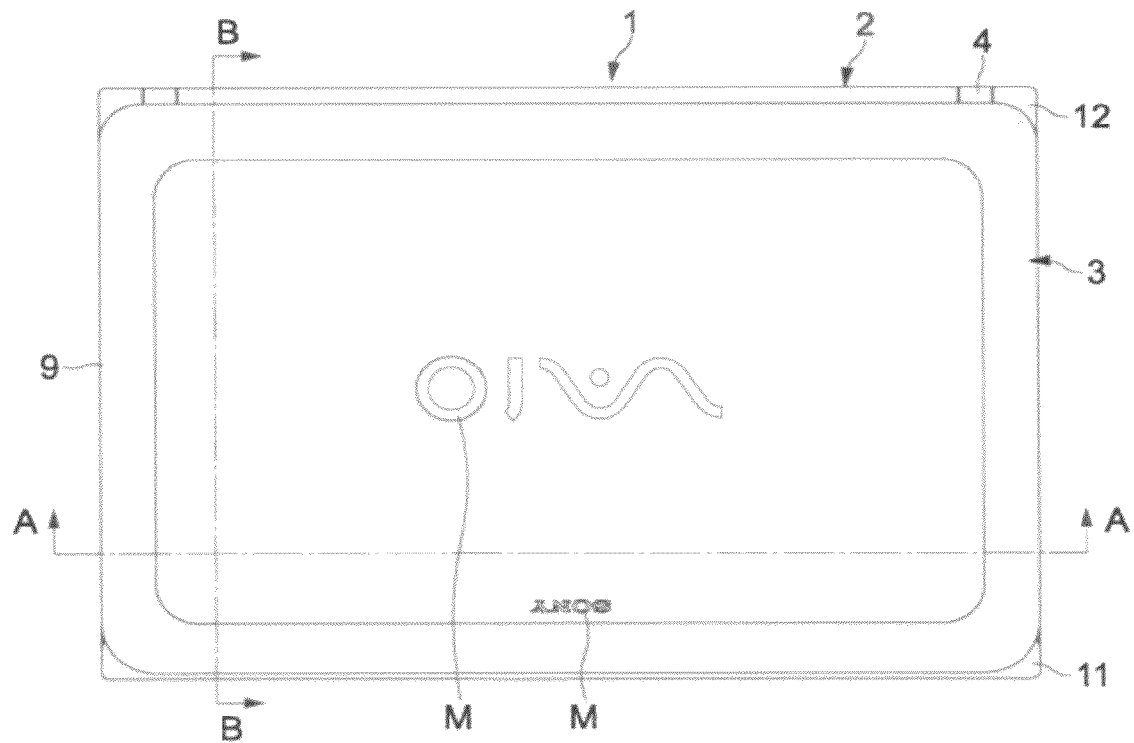
FIG. 8 is a plan view showing the closed state of the display unit of the PC according to the embodiment of the present disclosure.
Figure 10:
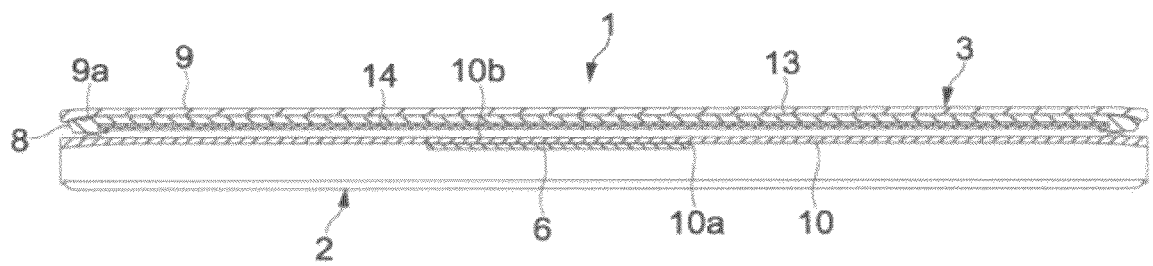
FIG. 10 is a schematic cross-sectional view taken along the line A-A in FIG. 8.
Figure 11:
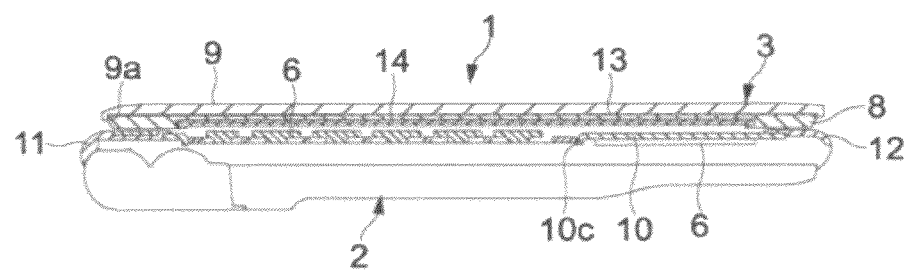
FIG. 11 is a schematic cross-sectional view taken along the line B-B in FIG. 8.
Figure 12:
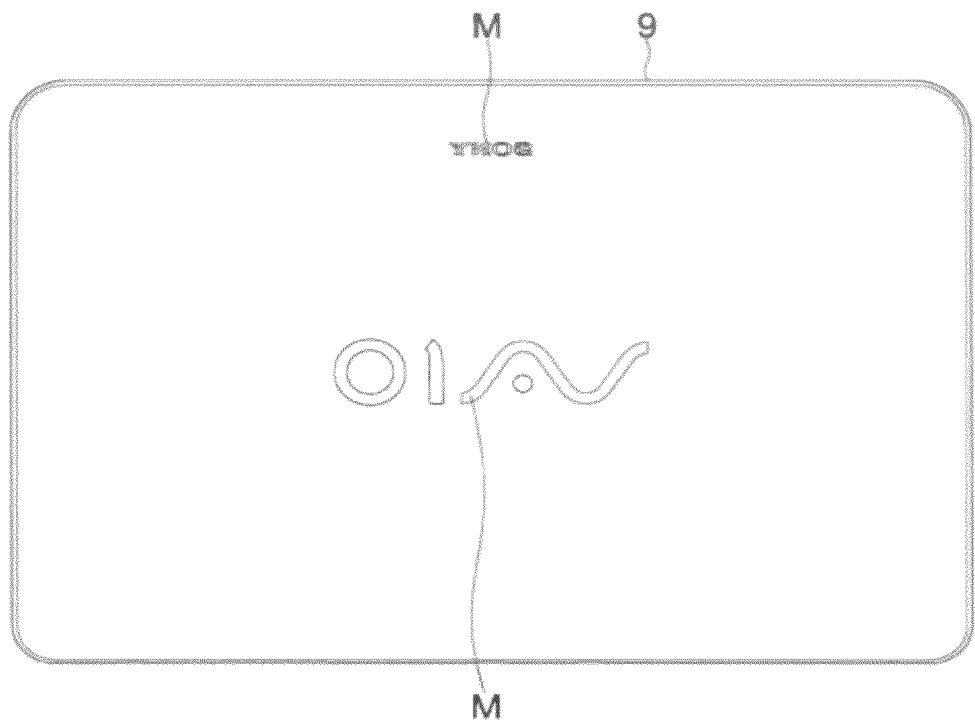
FIG. 12 is a bottom view showing a top plate of the PC according to the embodiment of the present disclosure.
Figure 13:
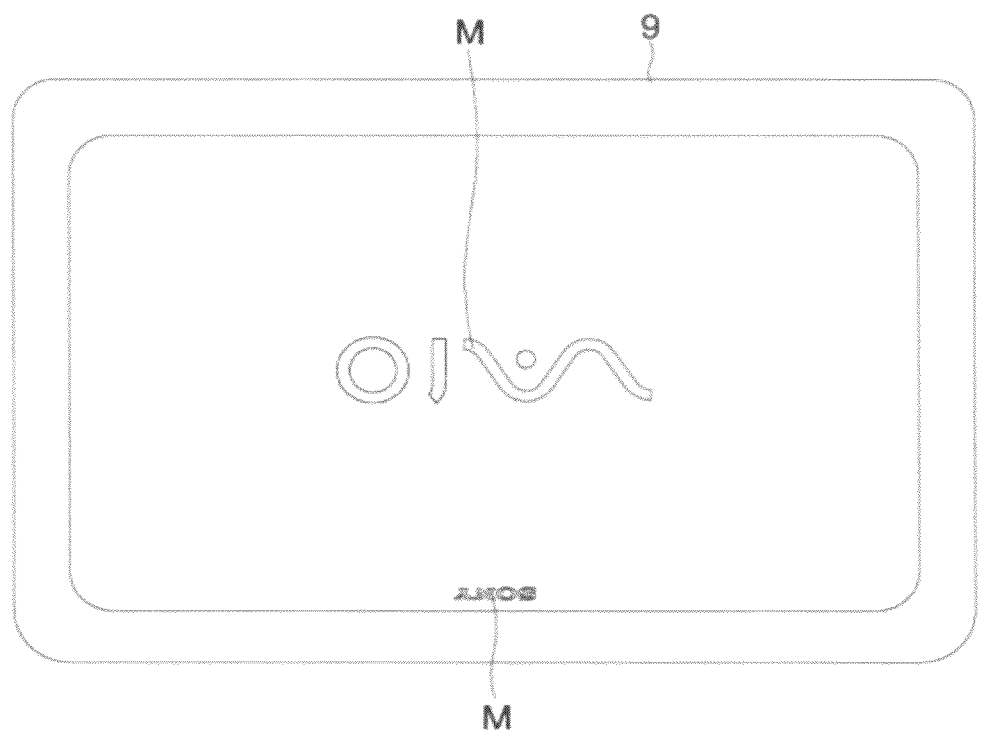
FIG. 13 is a plan view showing the top plate of the PC according to the embodiment of the present disclosure.

Next, the structure of the display unit 3 will be described. FIG. 10 is a schematic cross-sectional view taken along the line A-A in FIG. 8, and FIG. 11 is a schematic cross-sectional view taken along the line B-B in FIG. 8. Further, FIG. 12 is a bottom view showing the top plate 9 taken apart from the display unit 3, and FIG. 13 is a plan view showing the top plate 9 taken apart from the display unit 3.

As shown in FIGS. 4 to 7, 10, and 11, the display unit 3 includes the display panel unit 8 and the top plate 9. Into one surface of the display panel unit 8 (front surface), a display module 14 having a display screen is incorporated. To the other surface of the display panel unit 8 that is opposite to the display screen (rear surface), a protective sheet 13 for protecting the display panel unit 8 is attached.

To the rear surface of the display panel unit 8, via the protective sheet 13, one surface of the top plate 9 (rear surface) is attached fixedly. As shown in FIGS. 10 and 11, a concave portion 9a is provided to the rear surface of the top plate 9, and at least a part of the display panel unit 8 is accommodated in the concave portion 9a. Specifically, end portions of the top plate 9 on four sides are bent in the same direction so that the concave portion 9a described above is formed at a portion surrounded by those end portions. The thickness of an area corresponding to the concave portion 9a of the top plate 9 is substantially equal and front and rear surfaces thereof are flat surfaces. Further, the thickness of at least the left and right end portions of the top plate 9 is set so as to be gradually increased from the thickness of the area corresponding to the concave portion 9a.

Further, as shown in FIGS. 2, 8, 12, and 13, the top plate 9 is provided with logo marks M of, for example, a product name of this apparatus and a manufacturer name. Those logo marks M are formed as concave portions on the rear surface of the top plate 9. Here, a cross section of the concave portion representing the logo mark M is formed to be a right angle, for example, but it may have a semicircular, semielliptical, V-shaped, or other arciform cross-sectional configuration. By forming the concave portion to be V-shaped, for example, a molded product is easy to be released from a mold at a time of molding a top plate and a percentage of defective products is reduced, which enhances productivity.

A film is attached to the front surface of the top plate 9. The film enhances the strength of the front surface of the top plate 9 and also has a decorative function. Specifically, a gradation pattern is printed on the film, in which, for example, a central part that occupies a great part of the film is transparent, and a certain width portion from the ends of the top plate 9 on the four sides is gradually changed to be semi-transparent and then opaque.

Further, on the protective sheet 13 interposed between the display panel unit 8 and the top plate 9, a color or decorative pattern to hide the rear surface of the display panel unit 8 and to be seen through the transparent portion of the top plate 9 is printed. As the decorative pattern, a 3D pattern to allow the top plate 9 to be sterically seen may be adopted. Specifically, the protective sheet 13 may be formed as a 3D sheet. It may be possible to prepare color variations and decorative pattern variations for the protective sheet 13 such that the protective sheet 13 can be exchanged with one corresponding to a user's preference.

(Material of Top Plate)

Next, the material of the top plate 9 will be described.

The top plate 9 is formed of a plastic light-collecting plate having transparency. The light-collecting plate contains a fluorescent dye having light-condensing property. As the plastic, for example, poly methyl methacrylate, polycarbonate, or polystyrene is used. Due to the fluorescent dye, the top plate 9 collects natural light or artificial light on the surface thereof. Due to excitation light such as ultraviolet rays included in the collected light, the fluorescent dye within the top plate 9 emits light, and major part of the emitted light is induced to end surfaces of the top plate 9 (side surfaces connecting the end portions of the front surface and the end portions of the rear surface) while undergoing total reflection within the top plate 9, and then output from the end surfaces in a condensed state. Accordingly, the end surfaces (side surfaces) of the top plate 9 on the four sides emit bright light. Further, an edge portion of the logo mark M provided as a concave portion on the rear surface of the top plate 9 also emits bright light by the induced light within the top plate 9 densely gathering at that concave portion, similarly to the end surfaces described above. Accordingly, a decoration effect is obtained in which a silhouette of the top plate 9 and the logo marks M are profiled by the bright light.

The top plate 9 is manufactured by, for example, insert molding (IMF), including the concave portions as the logo marks M described above. Specifically, the film is formed in advance in vacuum in accordance with the shape of the top plate 9. By setting the film in a mold for injection molding having the shapes of the top plate 9 and logo marks M, injecting a molten resin serving as a material of the top plate 9 into the mold, fusing the film to the molten resin, and solidifying them, a top plate 9 integrally formed with the film is thus manufactured. Therefore, as compared to a seal or a printed logo mark in related art, it is possible to save costs for attachment of a seal or printing and effectively make the logo mark stand out due to the above-mentioned effect of the light by forming the logo mark as a concave portion.

In this manner, since a film is fused on the front surface of the top plate 9, the front surface has to be extremely flat. As described above, in this embodiment, the logo marks M are provided on the rear surface of the top plate 9 so as to cope with the problem.

[Structure of Main Body Unit]

Next, the structure of the exterior of the main body unit 2 will be described. As shown in FIGS. 1 and 3, the upper surface of the main body unit 2 (surface provided with the keyboard 5) is mainly covered with a deep-side plate 11, a near-side plate 12, a middle plate 10, and the like.

The deep-side plate 11 is an exterior unit including notch portions for securing movable areas for the hinges 4 and corresponding to an area where various types of switches such as a power switch are arranged. The near-side plate 12 is an exterior unit corresponding to a near portion where left and right click buttons attached to the touchpad 6 are arranged in the main body unit 2. The middle plate 10 is an exterior unit corresponding to a middle portion where the keyboard 5 and the touchpad 6 are arranged in the main body unit 2. Of those exterior plates, the middle plate 10 is formed of a plastic light-collecting plate having transparency as in the case of the top plate 9 described above. Therefore, as shown in FIGS. 1, 2, 6, and 7, end surfaces of the middle plate 10 that are exposed from the side surfaces of the PC 1 (side surfaces connecting the end portions of the front surface and the end portions of the rear surface) also emit bright light by the effect of light described above. Intending to obtain such an effect of light, the side surfaces of the middle plate 10 are designed to be exposed from the side surfaces of the main body unit 2. Further, the middle plate 10 is formed by injection molding, for example, including the logo marks M, as in the case of the top plate 9 described above.

The deep-side plate 11 and the near-side plate 12 are formed of a synthetic resin such as an AS resin or an ABS resin, as in the case of the bottom surface of the main body unit 2 and the exterior units of the respective side surfaces. The top plate 9 of the display unit 3 and the exterior units of the main body unit 2 have a common color.

Figure 14:
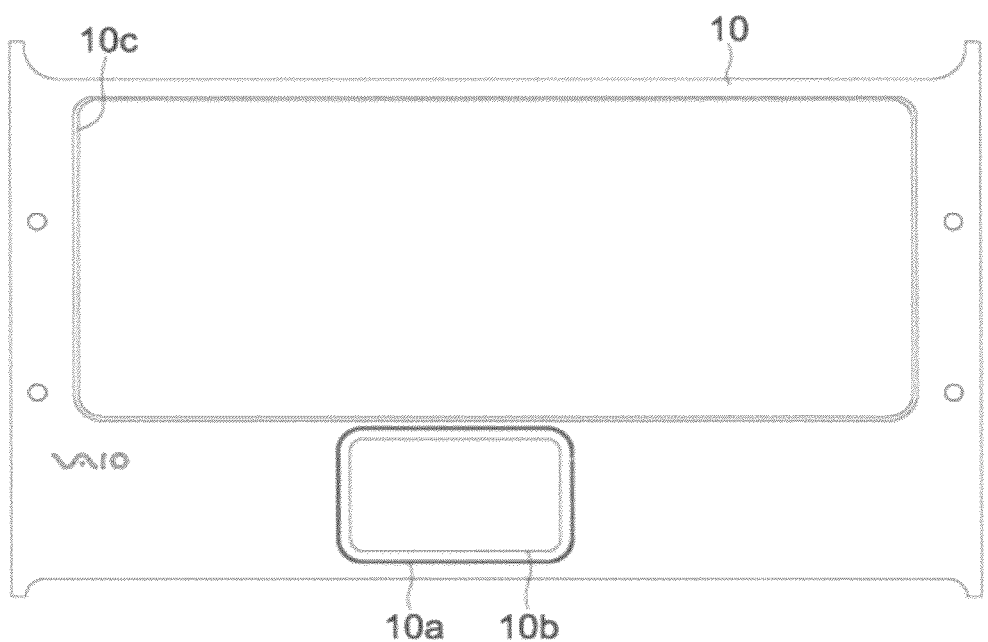
FIG. 14 is a plan view showing a middle plate of the PC according to the embodiment of the present disclosure.

FIG. 14 is a plan view showing the middle plate (palm rest) 10 formed of a plastic light-collecting plate. As shown in FIG. 14, the middle plate 10 has a rectangular hole 10c that passes through the front surface and rear surface of the middle plate 10 and exposes the keyboard 5.

As shown in FIG. 10, the thickness of the left and right end portions of the middle plate 10 are set so as to be gradually increased with respect to the thickness at the center thereof as in the case of the top plate 9 of the display unit 3. Specifically, the thickness of the middle plate 10 is set to be smaller as a distance from the end surface (side surface) becomes larger. With this structure, it is possible to improve design with use of light while securing setting positions of components located below the middle plate 10 within the main body unit 2.

As shown in FIG. 11, the thickness of an area between the left and right end portions of the middle plate 10 is substantially equal. It should be noted that an edge circumference of the hole 10c from which the keyboard 5 is exposed in the middle plate 10 is bent in a direction of the bottom surface of the main body unit 2 and uplifted. With this structure, the strength of the middle plate 10 particularly in the circumference of the hole 10c is improved. Further, the uplifted portion of the edge circumference of the hole 10c, that is, an inner surface of the hole 10c is to be an end surface that emit bright light by the induced light within the top plate 9 being condensed.

As shown in FIGS. 10 and 11, the rear surface of the middle plate 10 is provided with the touchpad 6 attached thereto using, for example, a double-sided tape or the like. As shown in FIGS. 10 and 14, the rear surface of the middle plate 10 is provided with a V-shaped groove 10a as a positioning mark of the touchpad 6. Specifically, the touchpad 6 is attached to the middle plate 10 while being aligned with a position of the V-shaped groove 10a of the middle plate 10 as a reference. Accordingly, since light is induced to end surfaces of the touchpad 6 and the V-shaped groove 10a described above and condensed, it is possible to achieve an effect in terms of decoration that causes the periphery of the touchpad 6 to emit bright light and an effect of improving operability by casing a user to visually identifying the position of the touchpad 6 immediately.

Further, as shown in FIGS. 10 and 14, a slightly concave portion 10b is formed on the front surface of the middle plate 10 in an area positioned slightly inner side of the position corresponding to the V-shaped groove 10a. The concave portion 10b is formed and accordingly the thickness of the middle plate 10 is adjusted so as to be a thickness at which the touchpad 6 can detect a capacitance. Further, at the periphery of the concave portion 10b, end surfaces are slightly formed in a direction substantially perpendicular to the direction in which light is induced within the middle plate 10. Therefore, it is possible for the user to visually identify the position of the touchpad 6 by the end surfaces in the periphery of the concave portion 10b emitting bright light.

[Visual Effect of Exterior]

Figure 15:
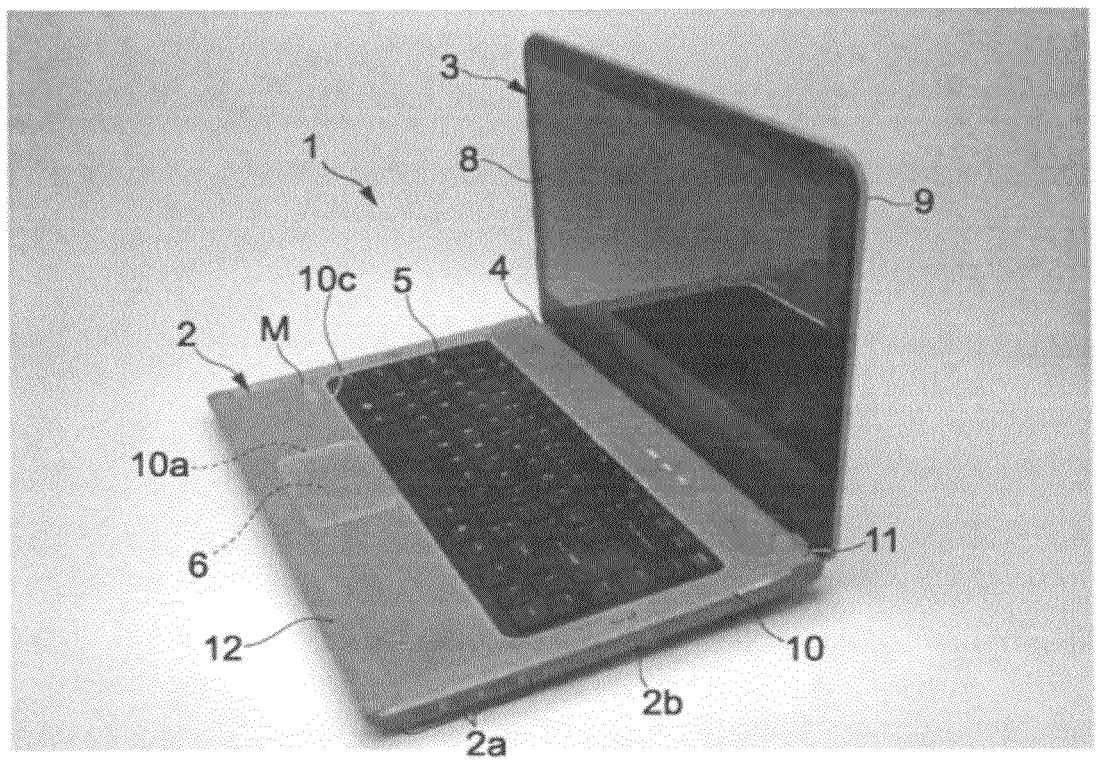
FIG. 15 is a photograph of the opened state of the display unit of the PC according to the embodiment of the present disclosure, which is obliquely taken from a right direction.
Figure 16:
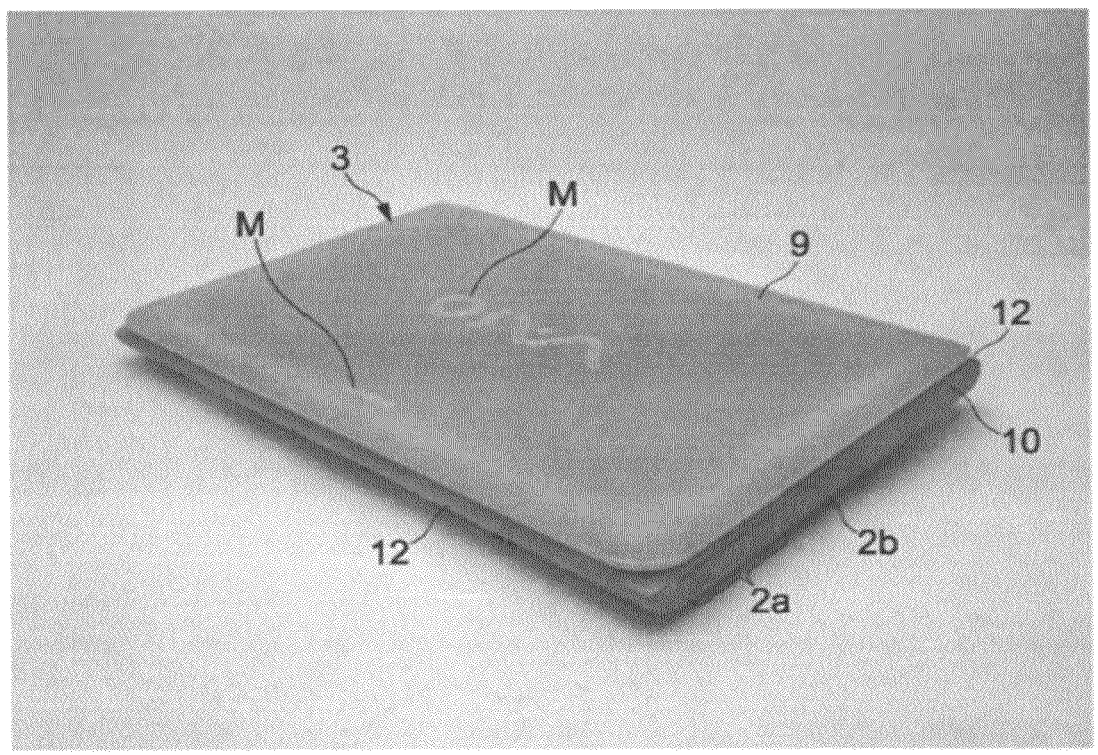
FIG. 16 is a photograph of the closed state of the display unit of the PC according to the embodiment of the present disclosure, which is obliquely taken from a right direction.
Figure 17:
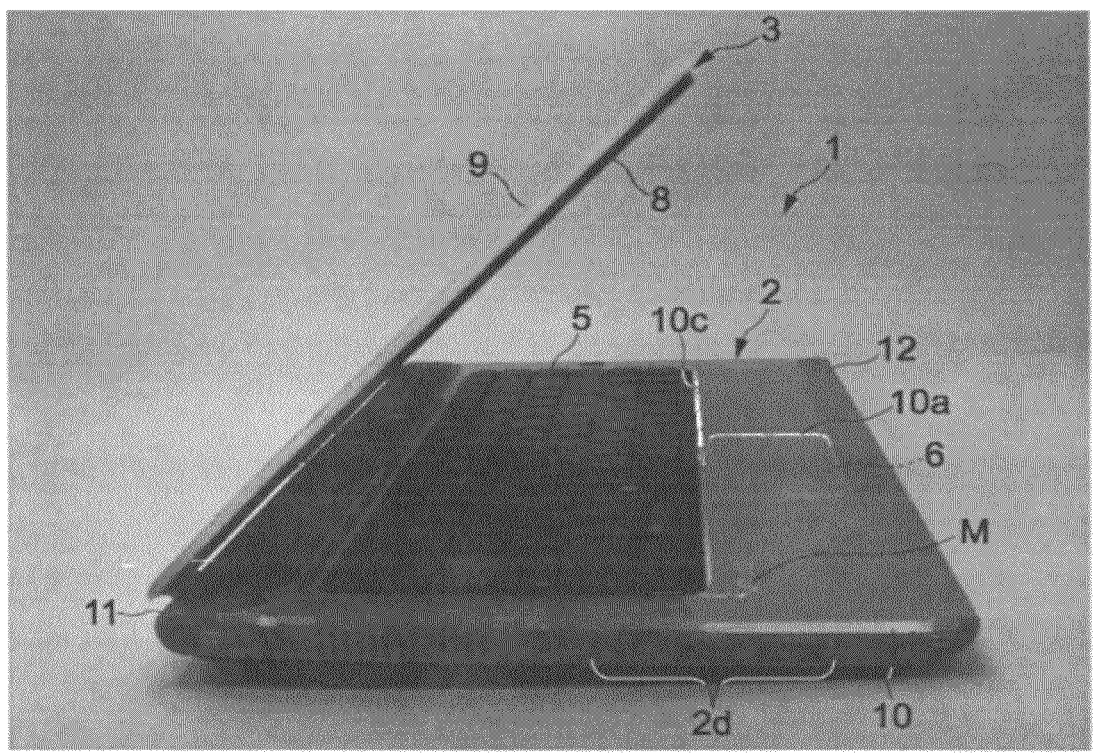
FIG. 17 is a photograph of the opened state of the display unit of the PC according to the embodiment of the present disclosure, which is taken from a left side direction.
Figure 18:
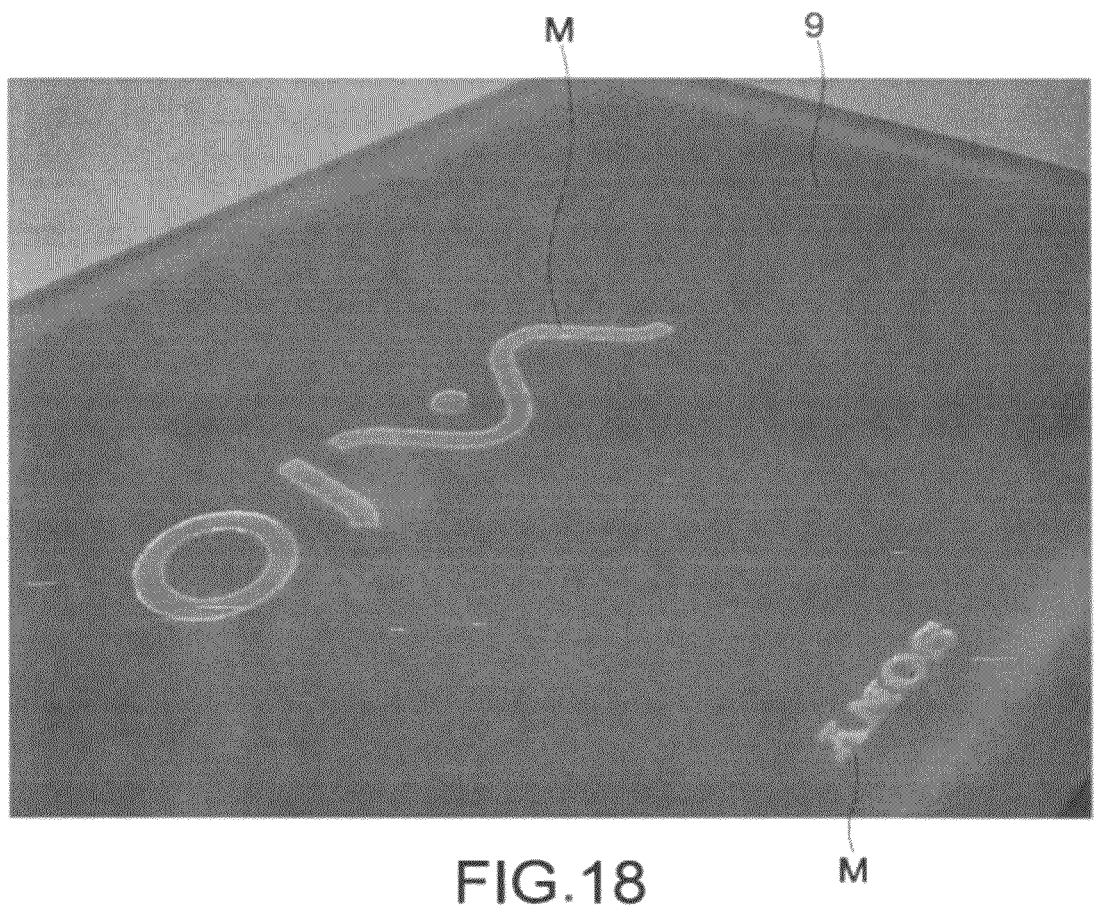
FIG. 18 is a photograph of logo marks and the vicinity thereof on the top plate of the PC according to the embodiment of the present disclosure.

FIG. 15 is a photograph of an opened state of the display unit 3 of the PC 1, which is obliquely taken from a right direction. FIG. 16 is a photograph of a closed state of the display unit 3 of the PC 1, which is obliquely taken from the right direction. FIG. 17 is a photograph of the opened state of the display unit 3 of the PC 1, which is taken from a left side direction, and FIG. 18 is a photograph of logo marks M and the vicinity thereof on the top plate 9 of the PC 1.

As shown in those figures, by adopting a plastic plate containing a fluorescent dye having light-condensing property as the top plate 9 and the middle plate 10, the end surfaces of the top plate 9 and the middle plate 10 emit bright light, and by forming a logo mark M as a concave portion on the top plate 9 and attaching the touchpad 6 to the rear surface of the middle plate 10, the periphery of the logo mark M and touchpad 6 emit bright light, which contributes to the improvement of the design of the PC 1.

[Conclusion]

According to the embodiment described above, a plastic plate containing a fluorescent dye having light-condensing property is used as the exterior members of the main body unit 2 and the display unit 3 of the PC 1, with the result that the designability of the PC 1 can be improved using light without increasing the number of steps in manufacturing or the number of components.

Further, in the display unit 3, the concave portions indicating the logo marks M are formed on the rear surface of top plate 9 containing a fluorescent dye having light-condensing property, with the result that the logo marks can be made to stand out while reducing costs, as compared to a logo mark obtained by attachment of a seal or printing in related art.

Further, in the main body unit 2, the touchpad 6 is attached to the rear surface of the middle plate 10 containing the fluorescent dye having light-condensing property, with the result that it is possible not only to improve designability, but also for user to visually identify the position of the touchpad 6 immediately.

Further, in this embodiment, the light-collecting plate is adopted in equipment having a relatively large shape on a top plate or an arrangement surface of a keyboard, such as a laptop PC, with the result that it is possible to ensure a sufficient amount of light induced to end surfaces thereof and effectively cause the end surfaces to emit light.

Modified Example

In the embodiment described above, the logo marks M as concave portions of the top plate 9 are provided by injection molding, but may be provided by other methods such as engraving. Further, although the logo marks M are provided on the rear surface of the top plate 9, instead of or in addition to this, the logo marks M may be provided on the front surface of the top plate 9. Further, instead of the logo marks M, various character strings or decorative patterns may be provided as concave portions. By providing a logo mark or other designs as concave portions on both the front surface and rear surface of the top plate 9, it is possible to differentiate between the front surface and the rear surface in visual performance, thus providing a more complicated and attractive design.

Another Embodiment

Next, another embodiment of the present disclosure will be described.

In this embodiment, a major part of a top plate in a display unit is formed of a transparent member without using a light-condensing material, and a sheet-like member with designs is arranged on a rear surface of the top plate.

Figure 19:
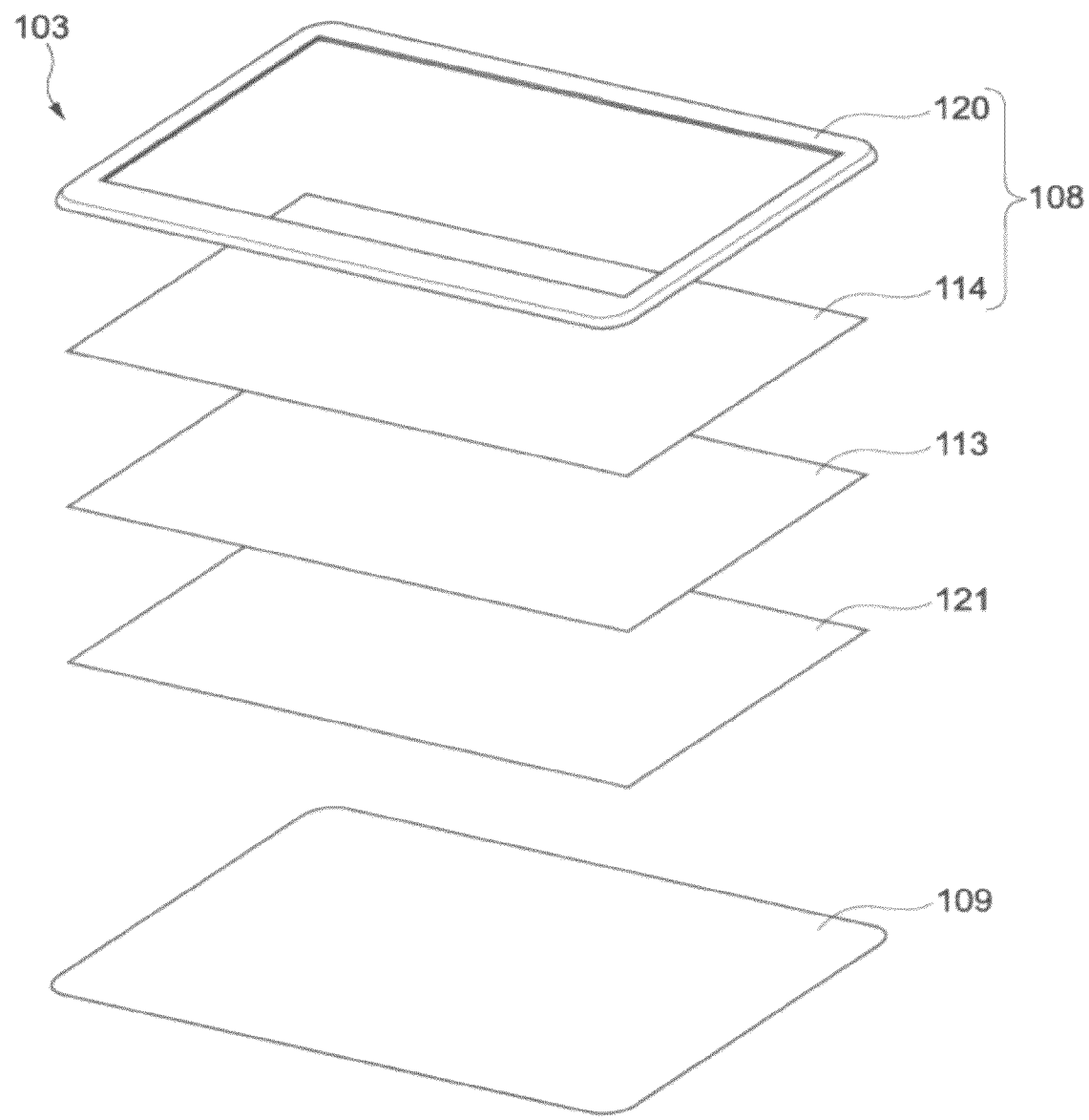
FIG. 19 is an exploded perspective view of a display unit of a PC according to another embodiment of the present disclosure.

FIG. 19 is an exploded perspective view showing a structure of a display unit of a PC according to this embodiment. It should be noted that the PC may have the same structure as that according to the embodiment described above, for example, except a display unit.

As shown in FIG. 19, a display unit 103 includes a display panel unit 108 and a top plate 109. Inside of a frame body 120 of the display panel unit 108, a display module 114 having a display screen is incorporated. To the other surface of the display panel unit 108 that is opposite to the display screen, a protective sheet 113 made of, for example, aluminum for protecting the display panel unit 108 is attached.

To a rear surface of the display panel unit 108, via the protective sheet 113 and a sheet-like member 121, one surface of the top plate 109 (rear surface) is attached fixedly.

Figure 20:
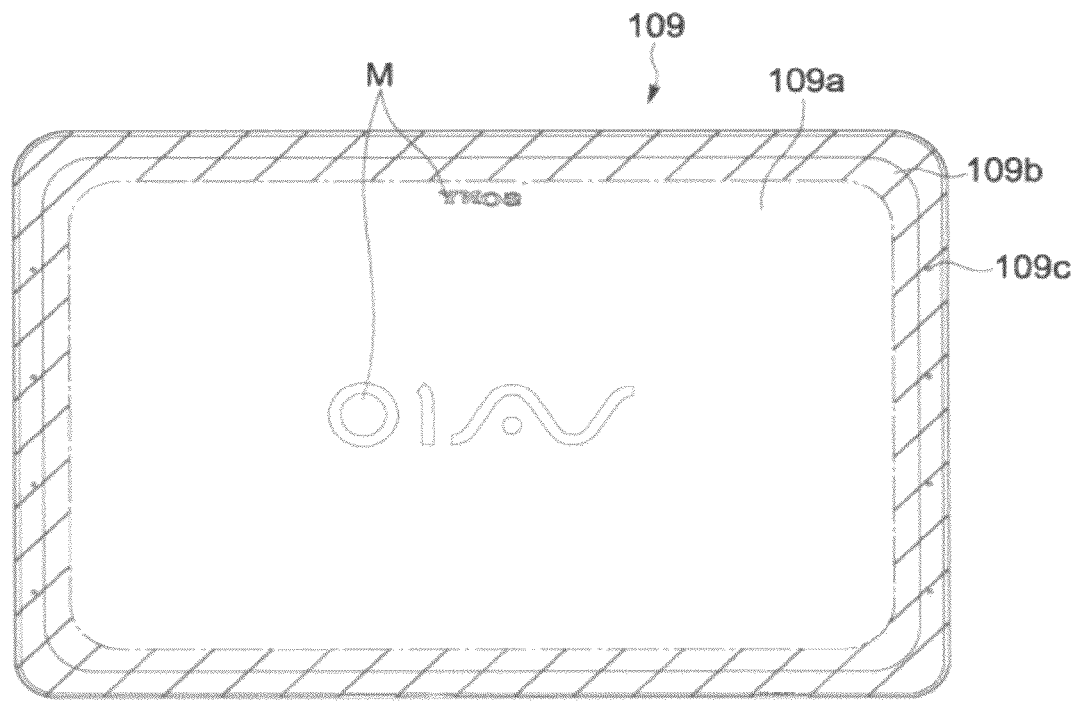
FIG. 20 is a view of a top plate shown in FIG. 19, seen from a rear surface.
Figure 21:
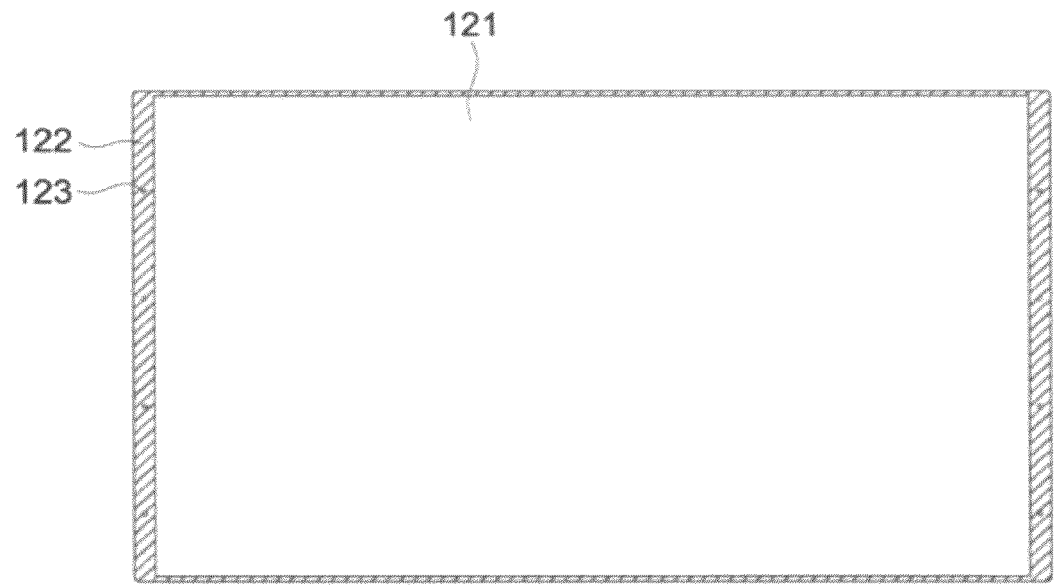
FIG. 21 is a plan view of a sheet-like member shown in FIG. 19.
Figure 22:
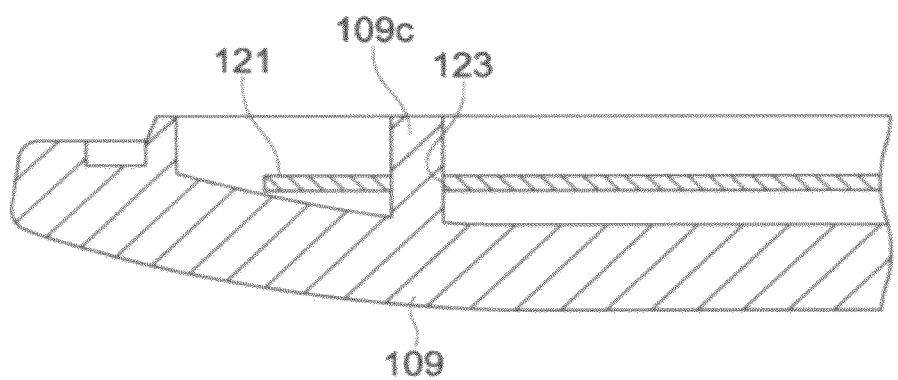
FIG. 22 is a partial cross-sectional view of the display unit shown in FIG. 19.

FIG. 20 is a view of the top plate 109 seen from the rear surface. FIG. 21 is a plan view of the sheet-like member 121. FIG. 22 is a cross-sectional view showing a state where the sheet-like member 121 is attached to the top plate 109.

Figure 23:
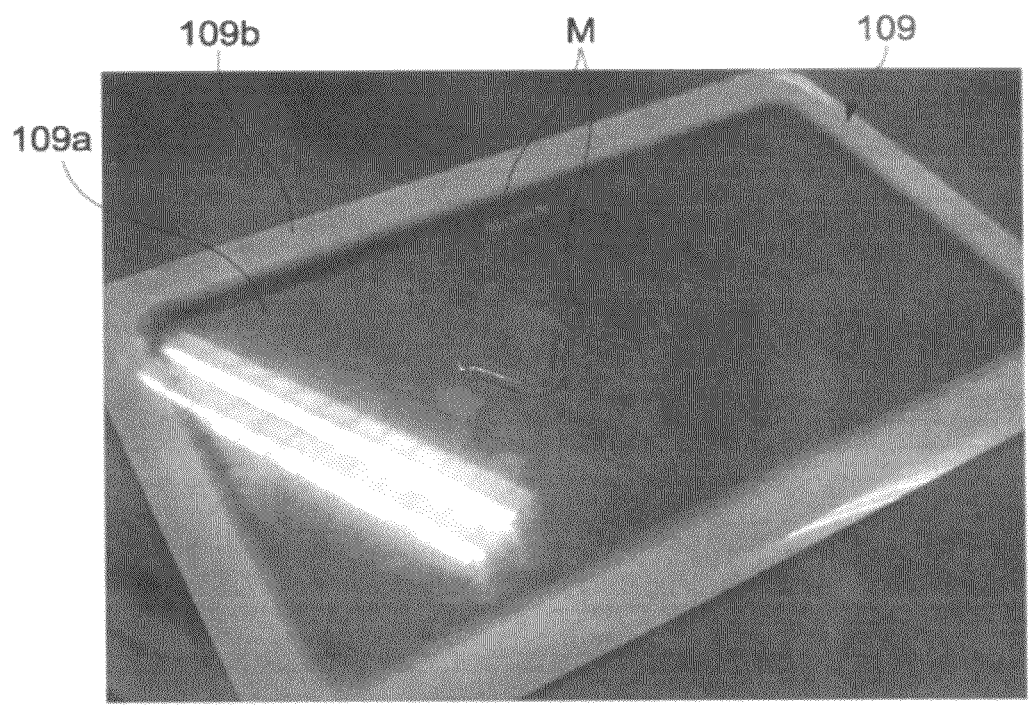
FIG. 23 is a photograph of a front surface of the top plate shown in FIG. 19, which is obliquely taken from a left direction.
Figure 24:
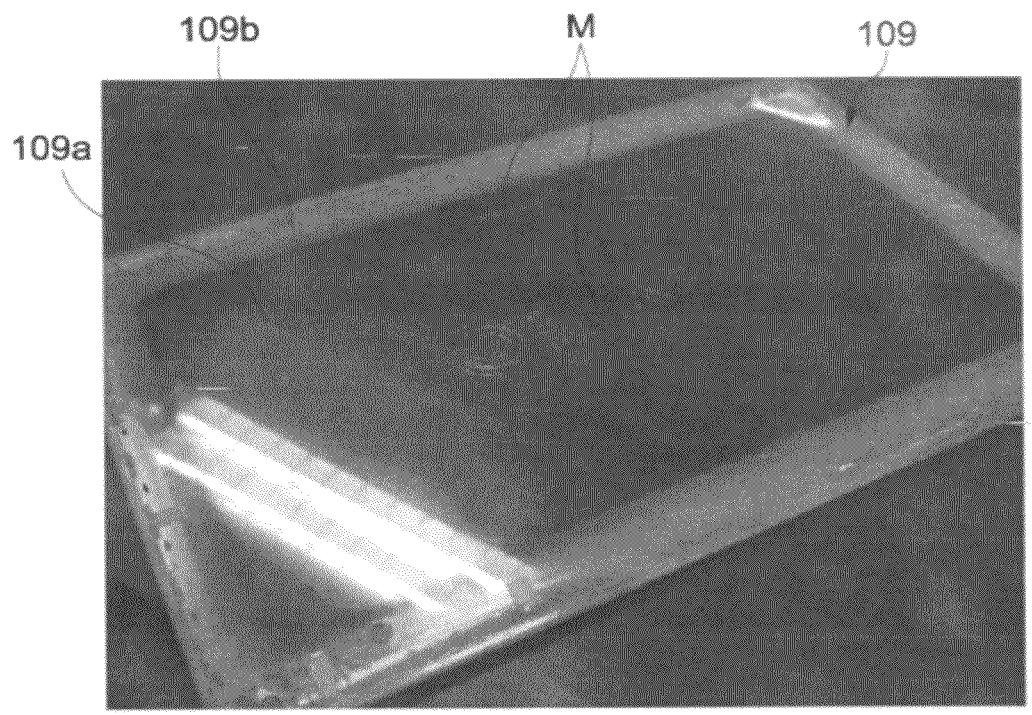
FIG. 24 is a photograph of a rear surface of the top plate shown in FIG. 19, which is obliquely taken from the left direction.

As shown in FIG. 20, the top plate 109 has a rectangular, transparent first area 109a as a major part, and an opaque second area 109b along an outer periphery of the first area 109a. In other words, the first area 109a is surrounded by the second area 109b (see photographs of FIGS. 23 and 24). For the top plate 109 having such a structure, for example, a material such as poly methyl methacrylate, polycarbonate, or polystyrene is used. The top plate 109 is produced by, for example, insert molding (IMF) or painting. The first area 109a may of course be semi-transparent.

The top plate 109 is provided with protrusion portions (positioning portions) 109c in the second area 109b on the rear surface thereof (see FIG. 22). The protrusion portions 109c are provided at four points with regular intervals along each of the two sides opposite to each other serving as the second area 109b. Those protrusion portions 109c are used for integrating the top plate 109 and the sheet-like member 121 by thermal fusion and also serve as means for positioning the sheet-like member 121.

The top plate 109 is provided with logo marks M of a product name of the PC, a manufacturer name, and the like. The logo marks M are represented by concave portions provided on the rear surface of the top plate 109. The concave portions are formed by providing convex portions to a mold at a time of insert molding. As a matter of course, the concave portions may be formed by laser processing or the like. Those logo marks M are formed as concave portions on the rear surface of the top plate 109. Here, a cross section of the concave portion representing the logo mark M is formed to be a right angle, for example, but it may have a semicircular, semielliptical, V-shaped, or other arciform cross-sectional configuration. By forming the concave portion to be V-shaped, for example, a molded product is easy to be released from a mold at a time of molding a top plate and a percentage of detective products is reduced, which enhances productivity.

Figure 25:
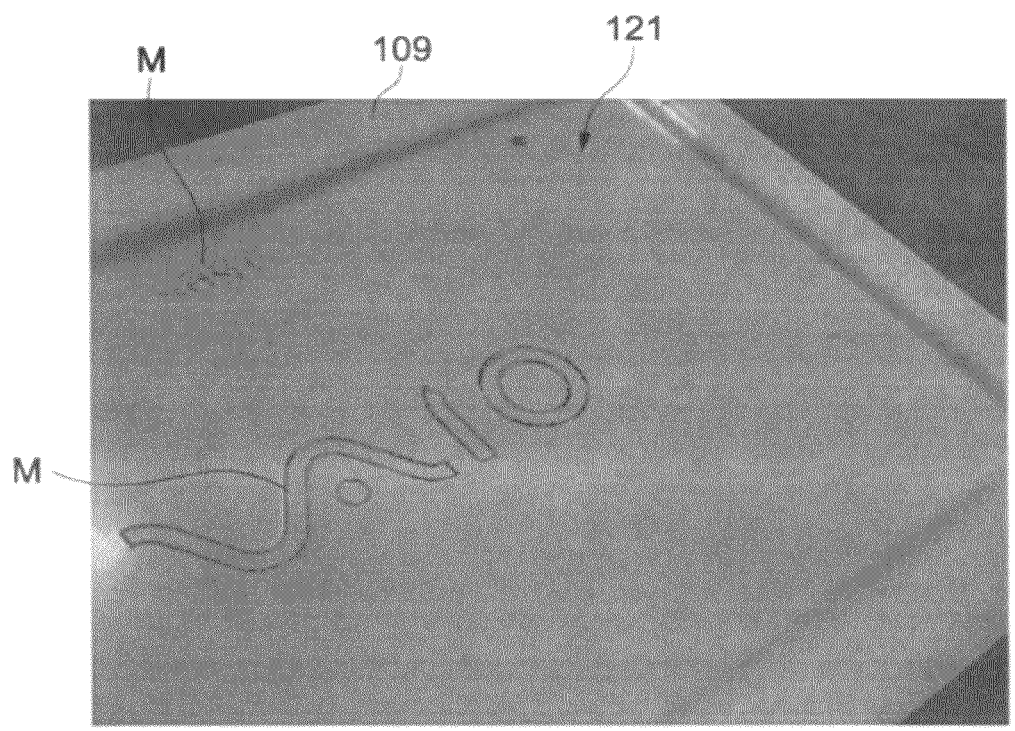
FIG. 25 is a photograph of a state where the sheet-like member is arranged on the top plate shown in FIG. 19, which is obliquely taken from the left direction (part 1)

As shown in FIG. 21, the sheet-like member 121 is slightly smaller than the top plate 109 in size and is formed of an opaque member (for example, a PET (polyethylene terephthalate) sheet or a PC (polycarbonate) sheet), a front surface of which is provided with a design. This design can be provided by printing on the sheet-like member 121, for example, which allows various designs to be provided with ease. Accordingly, PCs with a variety of designs can be provided to users at lower costs. No defective designs are generated dislike designs provided by painting in related art, and therefore costs for designs are reduced to 1/5 or less of those in related art (see photograph of FIG. 25).

Figure 26:
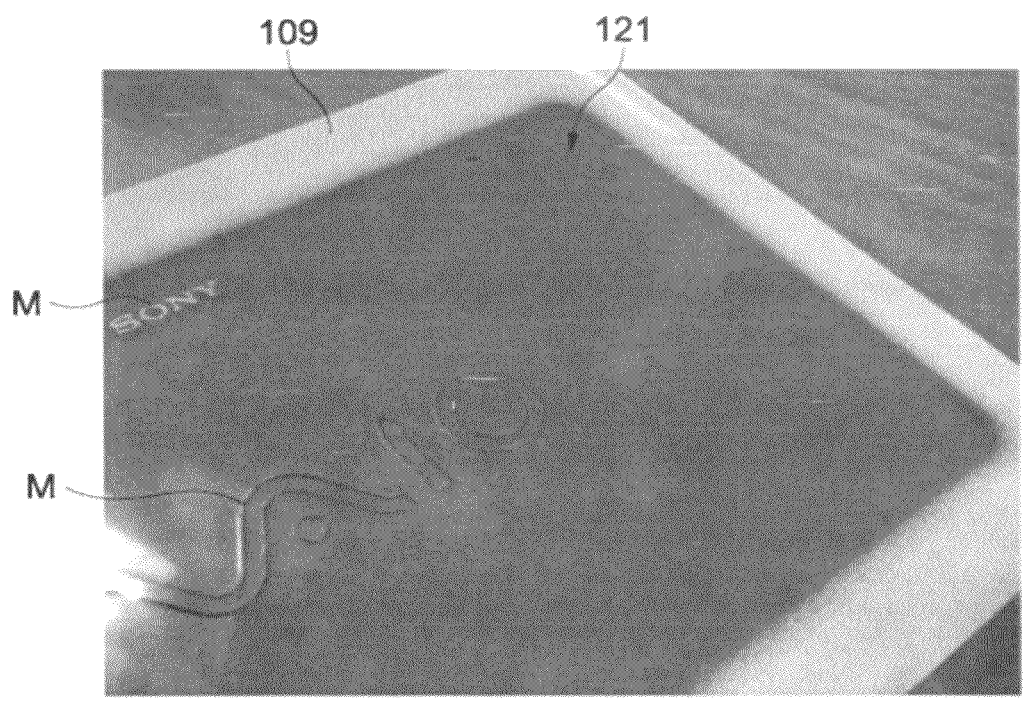
FIG. 26 is a photograph of a state where the sheet-like member is arranged on the top plate shown in FIG. 19, which is obliquely taken from the left direction (part 2)
Figure 27:
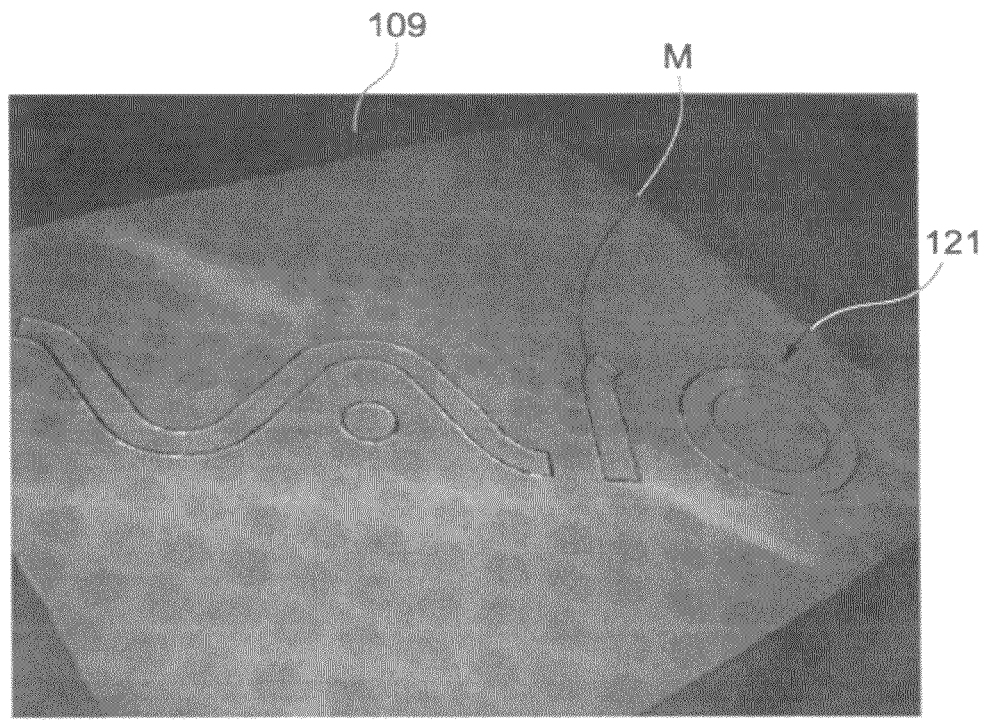
FIG. 27 is a photograph of a state where the sheet-like member is arranged on the top plate shown in FIG. 19, which is obliquely taken from the left direction (part 3)
Figure 28:
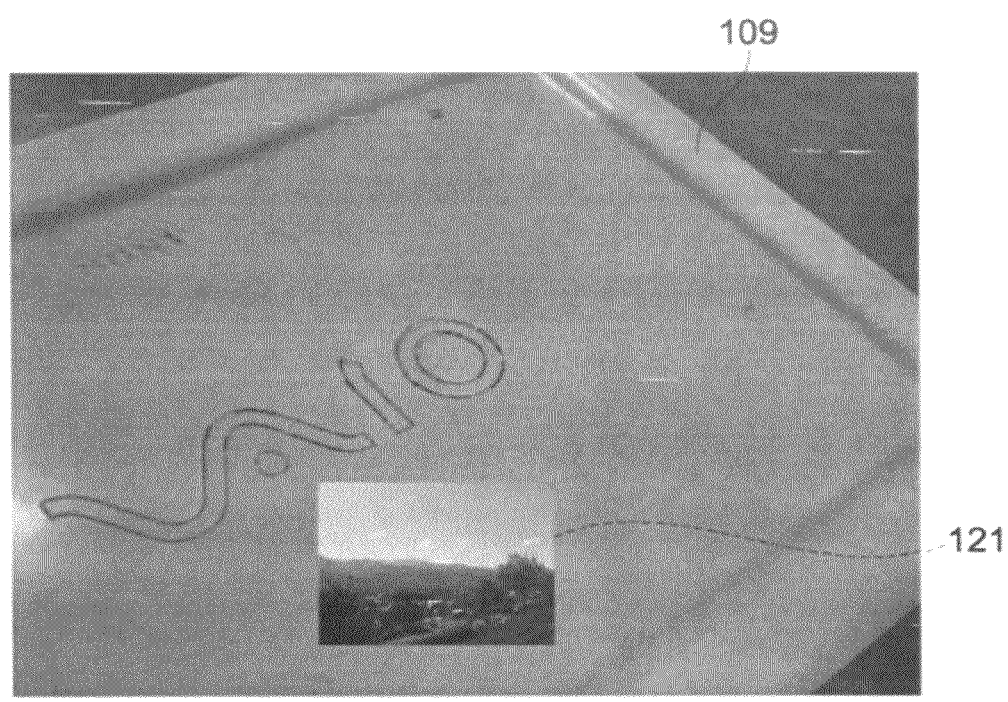
FIG. 28 is a photograph of a state where the sheet-like member is arranged on the top plate shown in FIG. 19, which is obliquely taken from the left direction (part 4)

In terms of the variety of designs, for example, patterns or the like are inserted into the sheet-like member 121 to be harmonized with designs suitable for insert molding or painting for the front surface while utilizing the thickness of the top plate 109, with the result that a stereoscopic effect can be realized (see photograph of FIG. 26). Further, for example, the sheet-like member 121 is formed as a 3D sheet of the like, and accordingly the design of the front surface can be profiled three-dimensionally (see photograph of FIG. 27). Furthermore, by inserting a photograph or the like to the sheet-like member 121, it is possible to customize a design in accordance with user's preference (see photograph of FIG. 28). Since such a sheet-like member 121 is opaque, it can hide an inner structure that may impair designability as a matter of course. Further, for example, by attaching a real gold leaf sheet to the sheet-like member 121, for example, it is possible to provide a PC with a high-class looking design that has not been conceived before.

On the surface of the sheet-like member 121 that is opposed to the top plate 109, a double-sided tape 122 is attached along an outer periphery thereof. The sheet-like member 121 is fixed to the top plate 109 by the double-sided tape 122. The sheet-like member 121 and the double-sided tape 122 are provided with through-holes 123 at common positions. Each of the through-holes 123 is provided at a position corresponding to the protrusion portion 109c provided to the top plate 109.

Figure 29:
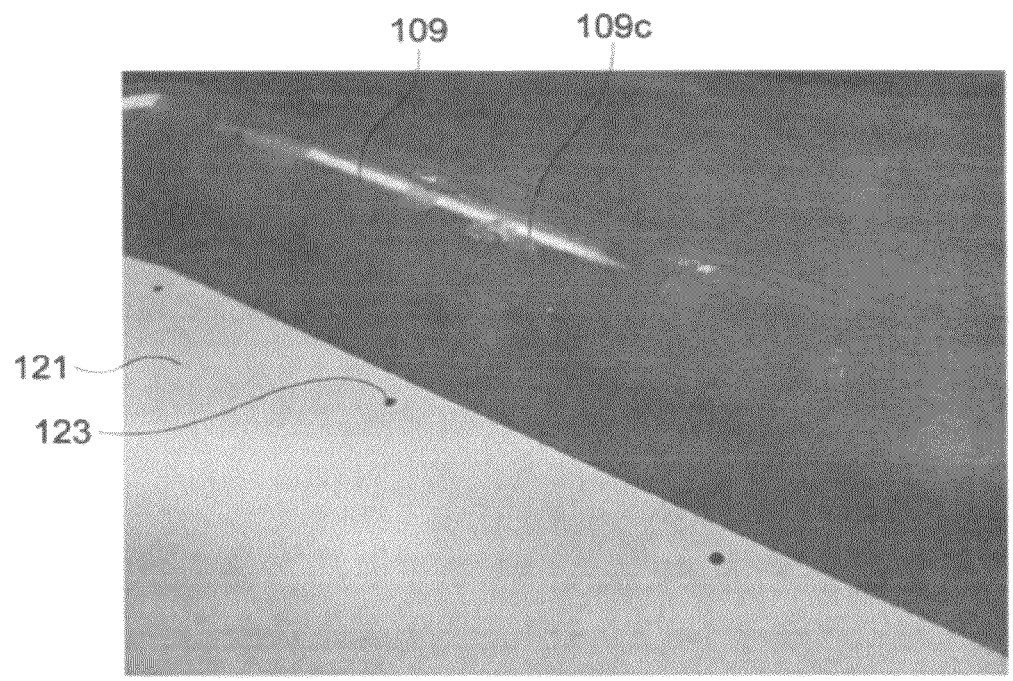
FIG. 29 is a photograph of a state where the sheet-like member is attached to a protrusion portion of the top plate shown in FIG. 19, which is obliquely taken from the left direction (part 1)
Figure 30:
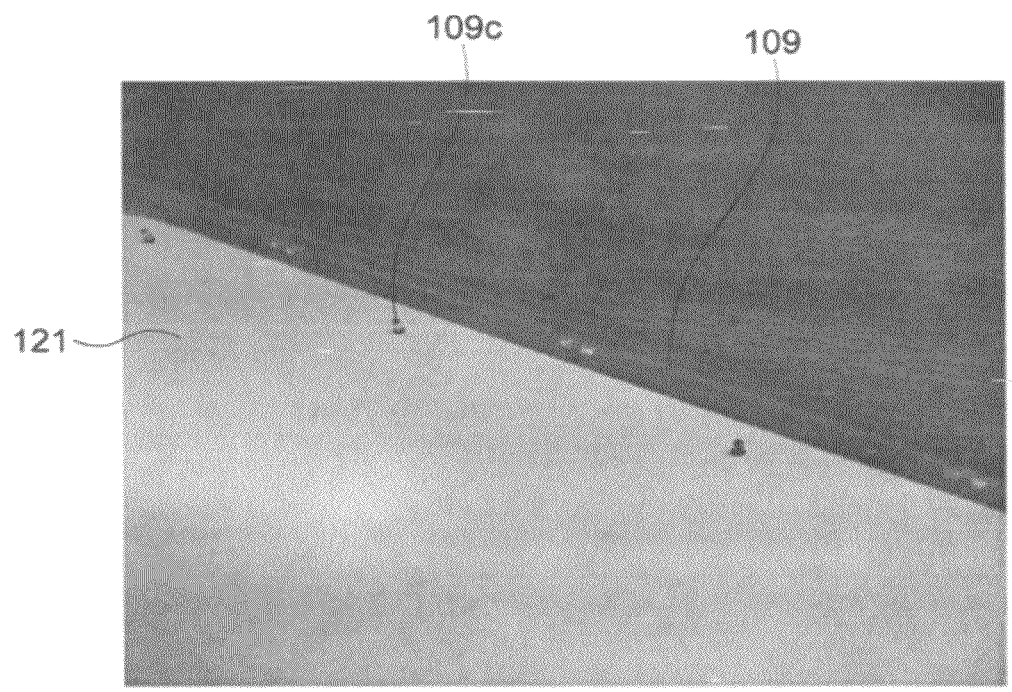
FIG. 30 is a photograph of a state where the sheet-like member is attached to the protrusion portion of the top plate shown in FIG. 19, which is obliquely taken from the left direction (part 2)

As shown in FIG. 22, the protrusion portions 109c provided to the top plate 109 are inserted into the respective through-holes 123 of the sheet-like member 121 (see photographs of FIGS. 29 and 30). A leading end of each of the protrusion portions 109c is crushed by thermal fusion to function as a fusing boss. Accordingly, the sheet-like member 121 can be firmly fixed to the top plate 109 at low costs. Although such protrusion portions 109c are unattractive looking for a user, the protrusion portions 109c are not seen by the user because being provided to the opaque second area 109b. Therefore, the protrusion portions 109c as described above do not impair designability of the PC.

Figure 31:
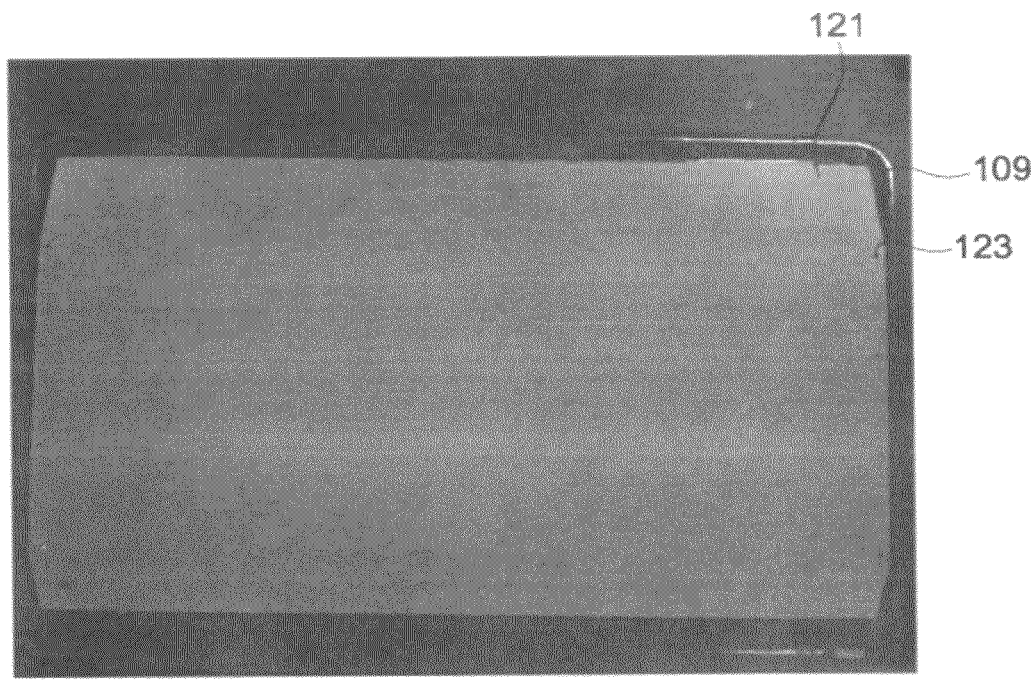
FIG. 31 is a photograph of a state where the sheet-like member is attached to the protrusion portion of the top plate shown in FIG. 19, which is obliquely taken from the front.
Figure 32:
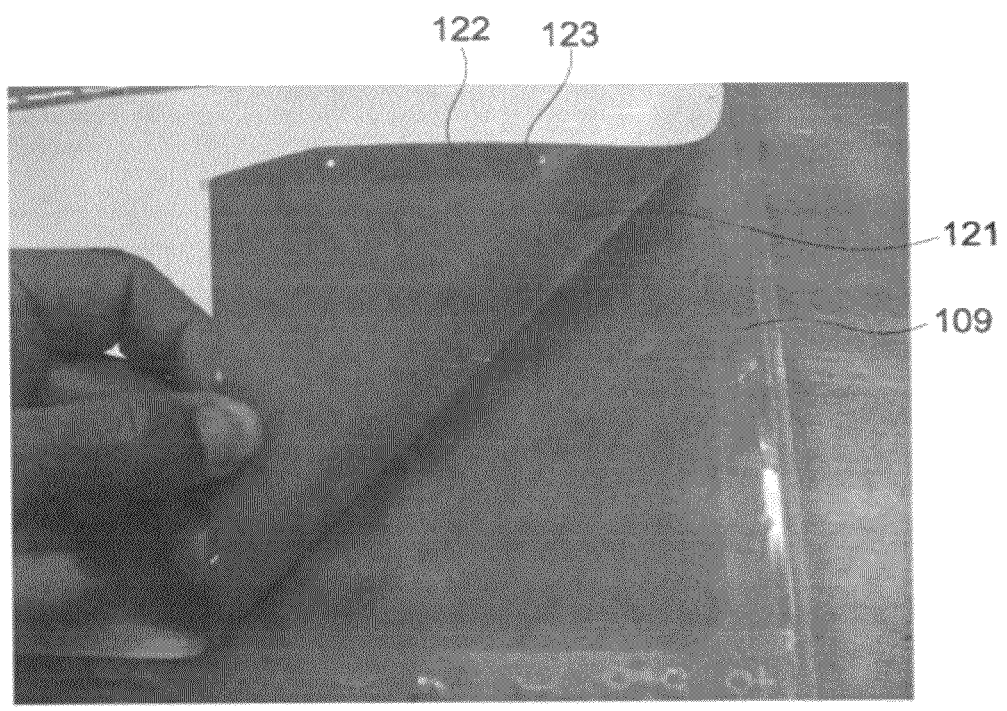
FIG. 32 is a photograph of a state where the sheet-like member is attached to the top plate shown in FIG. 19 with a double-sided tape, which is obliquely taken from the front.

The double-sided tape 122 is interposed between the top plate 109 and the sheet-like member 121 in the vicinity of outer edges thereof to bond the top plate 109 and the sheet-like member 121 (see photographs of FIGS. 31 and 32). Since the double-sided tape 122 surrounds the first area 109a on the rear surface of the top plate 109, the first area 109a on the rear surface of the top plate 109 is substantially in a sealed state by the top plate 109, the sheet-like member 121, and the double-sided tape 122. Since the first area 109a of the top plate 109 is transparent, if the first area 109a on the rear surface of the top plate 109 is not sealed, dust or the like enter that area and seen through the front surface of the top plate 109, which impairs the aesthetic appearance thereof. On the other hand, in this embodiment, the first area 109a on the rear surface of the top plate 109 is substantially in a sealed state, with the result that it is possible to prevent the aesthetic appearance from being impaired due to dust or the like with very simple structure.

In this embodiment, the first area 109a of the top plate 109 is transparent or semi-transparent, but the top plate 109 may be formed of a plastic, transparent light-collecting plate containing a fluorescent dye having light-condensing property as described in the first embodiment.

Further, in this embodiment, the example in which the present disclosure is applied to the display unit of the PC has been described. However, the present disclosure is applicable to a palm rest or the like of the main body unit of the PC and can be similarly implemented.

Further Another Embodiment

Next, a further another embodiment of the present disclosure will be described.

Figure 33:
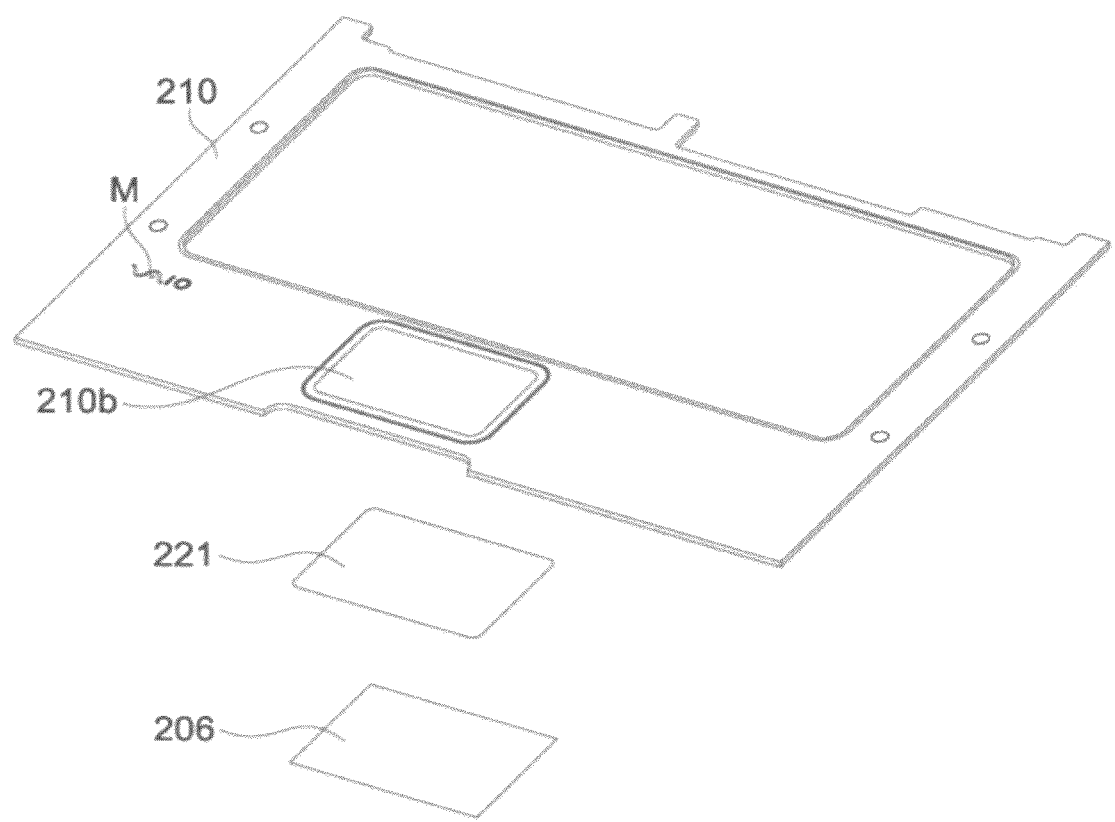
FIG. 33 is an exploded perspective view showing a structure of a touchpad portion in a middle plate of a PC according to still another embodiment of the present disclosure.
Figure 34:
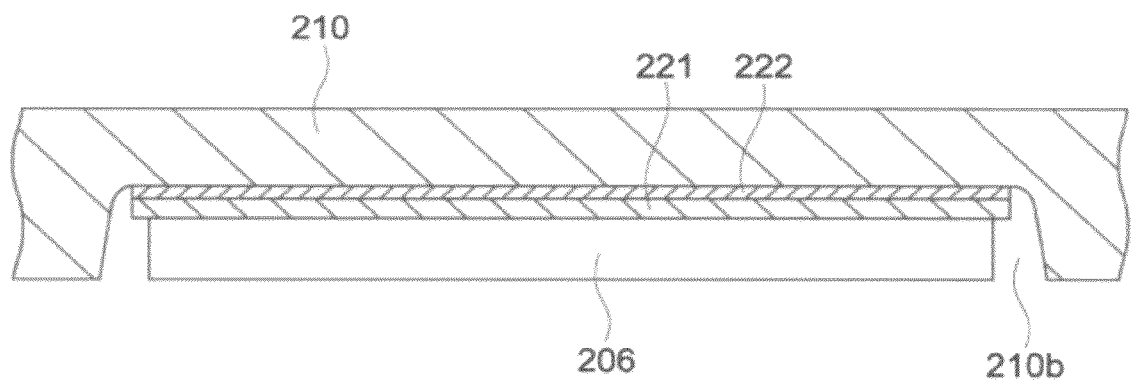
FIG. 34 is a partial cross-sectional view showing the structure of the touchpad portion shown in FIG. 33.

FIG. 33 is an exploded perspective view showing a structure of a touchpad portion in a middle plate of a PC according to this embodiment. FIG. 34 is a cross-sectional view showing the structure of that portion. It should be noted that the PC may have the same structure as that according to the embodiments described above, for example, except a touchpad portion.

As shown in FIGS. 33 and 34, in the PC according to this embodiment, a sheet-like member 221 that has been subjected to printing or painting is arranged between the rear surface of a middle plate 210 and a touchpad 206.

The middle plate 210 is formed of a plastic light-collecting plate having transparency. Therefore, end surfaces of the middle plate 210 that are exposed from the side surfaces of the PC (side surfaces connecting the end portions of the front surface and the end portions of the rear surface) also emit bright light by the effect of light described above. Further, the middle plate 210 is formed by injection molding, for example, including logo marks M, as in the case of the top plate. On the rear surface of the middle plate 210, a slightly concave portion 210b is formed. The concave portion 210b is formed and accordingly the thickness of the middle plate 210 is adjusted so as to be a thickness at which the touchpad 206 can detect a capacitance.

Figure 35:
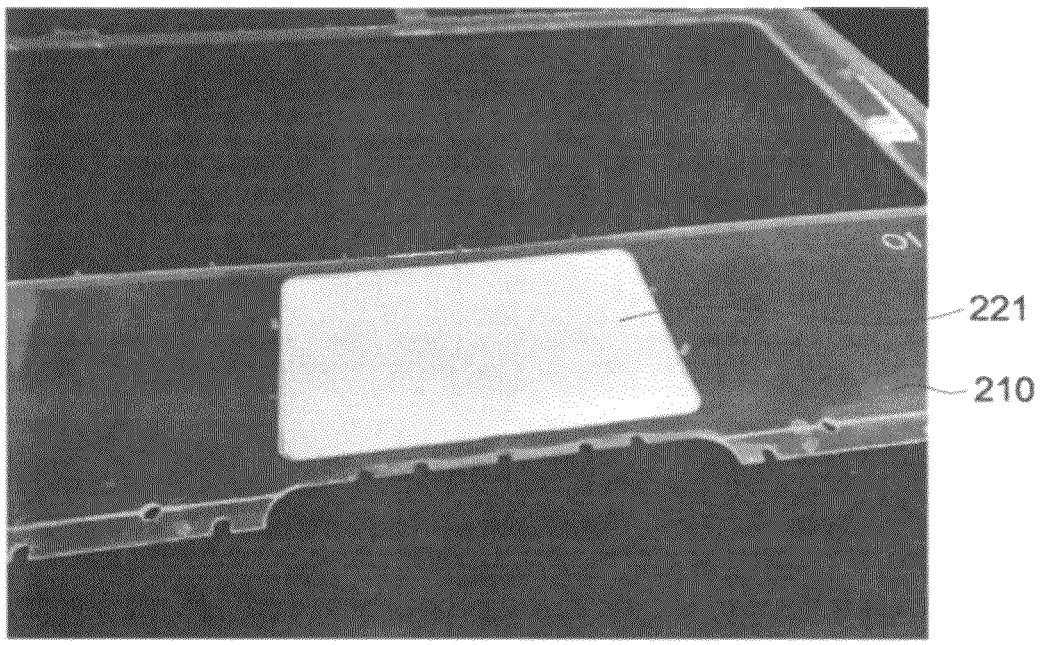
FIG. 35 is a photograph of a state where a sheet-like member shown in FIG. 33 is arranged on the middle plate, which is obliquely taken from an upward direction of a rear surface of the middle plate.

The sheet-like member 221 is formed of, for example, a PET (polyethylene terephthalate) sheet or a PC (polycarbonate) sheet, and has substantially the same size as that of the touchpad 206 and covers the entire surface of the touchpad 206. The thickness of the sheet-like member 221 has to be a thickness at which a function of the touchpad 206 is not impaired. One surface of the sheet-like member 221 is provided with a printed or painted layer 222 for reflecting light. The printed or painted layer 222 is in contact with the rear surface of the middle plate 210. FIG. 35 is a photograph showing a state where the sheet-like member 221 is arranged on the middle plate 210, obliquely seen from an upward direction of the rear surface of the middle plate 210.

Figure 36:
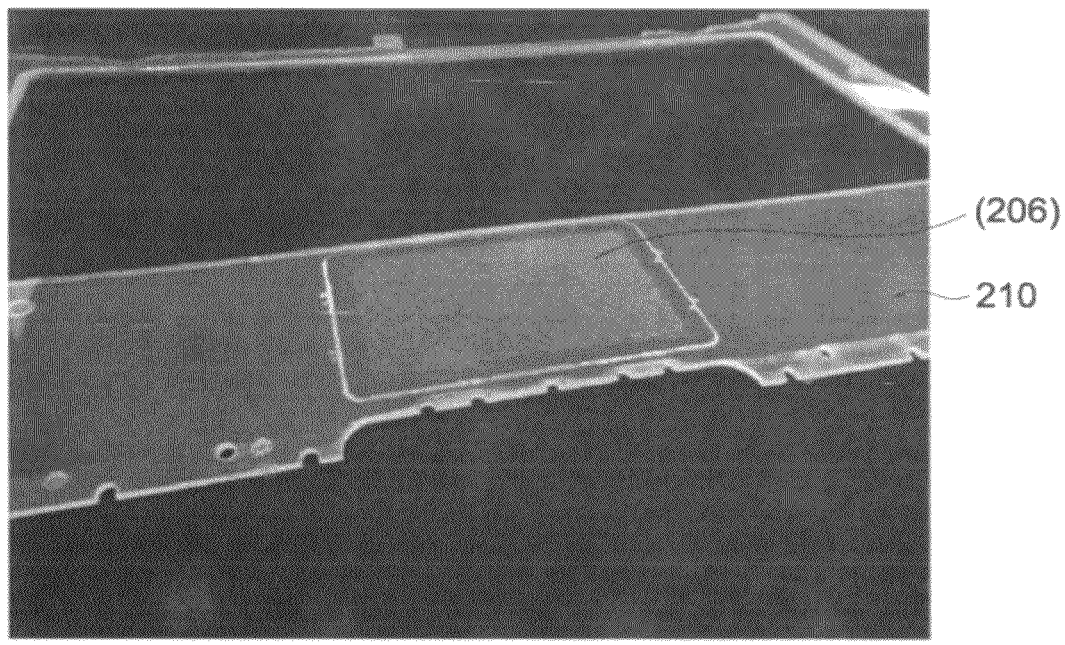
FIG. 36 is a photograph of a state where the sheet-like member is not arranged on the middle plate shown in FIG. 33, which is obliquely taken from the upward direction of the rear surface of the middle plate.
Figure 37:
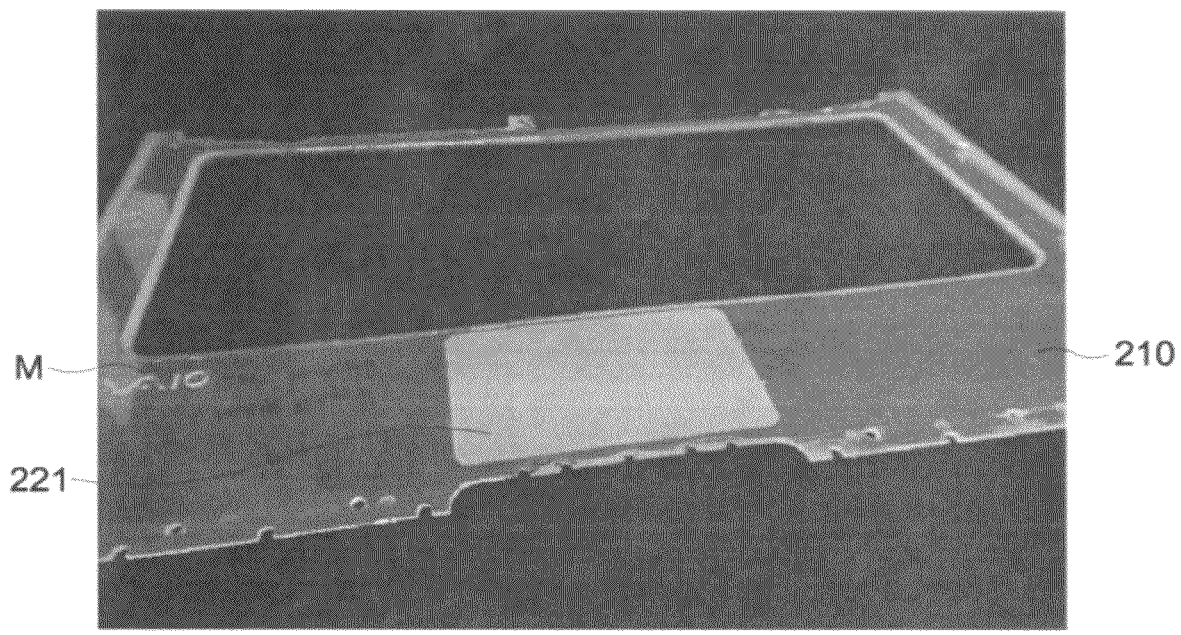
FIG. 37 is a photograph of a state where the sheet-like member is arranged on the middle plate shown in FIG. 33, which is obliquely taken from the upward direction of the rear surface of the middle plate.

In this manner, the sheet-like member 221 having the printed or painted layer 222 is arranged in an area where the touchpad 206 of the middle plate 210 is to be arranged, with the result that this area emits stronger light to the front surface of the middle plate 210 as compared to the vicinity thereof. In other areas, light reflected on the rear surface inside the middle plate 210 is controlled by an incident angle and is not fully reflected. On the other hand, in this area, light is fully reflected on the printed or painted layer 222 to be incident at an acute angle on the front surface of the middle plate (area where the touchpad 206 is arranged) and output without being reflected on that surface. Therefore, this area is seen to be much brighter than other areas. Further, FIG. 36 is a photograph showing the case where the sheet-like member 221 is not arranged on the middle plate 210, and FIG. 37 is a photograph showing the case where the sheet-like member 221 is arranged on the middle plate 210. From those photographs, it is apparent that the arrangement of the sheet-like member 221 allows that area to be bright. With this structure, the area of the touchpad 206 emits light without newly adding a light source or the like, which provides excellent designability. Further, the area of the touchpad 206 is made clear, which provides excellent operability.

In the embodiments described above, a laptop PC is exemplified as the information processing apparatus. However, the present disclosure is applicable to, for example, a tablet PC, a portable information terminal, a mobile phone, a smartphone, a portable game console, an electronic dictionary, an electronic book terminal, a portable audio/video player, a car navigation apparatus, and other information processing apparatuses. In this case, the information processing apparatus may not be provided with a display unit.

The present disclosure contains subject matter related to that disclosed in Japanese Priority Patent Application JP 2010-170114 filed in the Japan Patent Office on Jul. 29, 2010 and Japanese Priority Patent Application JP 2010-285761 filed in the Japan Patent Office on Dec. 22, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
an exterior plate formed of a plate-like member having one of a transparent first area and a semi-transparent first area; and
a sheet-like member arranged on a rear surface of the exterior plate, the sheet-like member including a pattern viewable through the one of the transparent first area and the semi-transparent first area of the exterior plate.

2. The information processing apparatus according to claim 1, wherein
the exterior plate has an opaque second area including a positioning portion for positioning with respect to the sheet-like member.

3. The information processing apparatus according to claim 2, wherein
the exterior plate includes, as the positioning portion, a protrusion portion for being integrated with the sheet-like member in the second area by thermal fusion, and
the sheet-like member includes a first hole through which the protrusion portion passes at a position corresponding to the protrusion portion.

4. The information processing apparatus according to claim 3, wherein
the first area is surrounded by the second area, and
the information processing apparatus further comprising a double-sided tape that is arranged to correspond to the second area between the exterior plate and the sheet-like member and includes a second hole through which the protrusion portion passes at a position corresponding to the protrusion portion.

5. The information processing apparatus according to claim 1, wherein
the exterior plate contains a fluorescent dye to collect light, the information processing apparatus further comprising:
a touchpad arranged on the rear surface of the exterior plate in the first area; and
a reflective layer arranged between the rear surface of the exterior plate in the first area and the touchpad.

6. An information processing apparatus, comprising:
a main body unit having a first surface provided with a keyboard; and
a plate having a second surface in contact with the first surface, a third surface opposed to the second surface, a fourth surface connecting an end portion of the second surface and an end portion of the third surface, and a hole that passes through the second surface and the third surface and exposes the keyboard, the plate containing a fluorescent dye to collect light; and
a sheet-like member arranged beneath the plate to reflect light, the sheet-like member including a pattern.

7. The information processing apparatus according to claim 6, further comprising a touchpad set to be in contact with the second surface.

8. The information processing apparatus according to claim 6, wherein
the plate includes a groove indicating a setting position of the touchpad on the second surface.

9. The information processing apparatus according to claim 6, wherein
the plate has a thickness that is gradually reduced as a distance from the fourth surface becomes larger.

10. The information processing apparatus according to claim 1, wherein the pattern included on the sheet-like member is a three-dimensional pattern.

11. The information processing apparatus according to claim 1, wherein the sheet-like member is colored.

12. The information processing apparatus according to claim 7, wherein the sheet-like member is arranged beneath the touch pad.

* * * * *